(12) United States Patent
Yu et al.

(10) Patent No.: US 10,310,290 B2
(45) Date of Patent: Jun. 4, 2019

(54) CAMERA MODULE HAVING STABILIZER AND ELECTRONIC DEVICE INCLUDING THE SAME

(71) Applicant: Samsung Electronics Co., Ltd., Suwon-si, Gyeonggi-do (KR)

(72) Inventors: Young-Bok Yu, Anyang-si (KR); Hyung-Jin Rho, Yongin-si (KR); Joong-Wan Park, Suwon-si (KR); Hyun-Ho Ryoo, Giheung-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 15/291,328

(22) Filed: Oct. 12, 2016

(65) Prior Publication Data

US 2017/0108705 A1    Apr. 20, 2017

(30) Foreign Application Priority Data

Oct. 20, 2015   (KR) .......................... 10-2015-0146195

(51) Int. Cl.
*G02B 27/64* (2006.01)
*H04N 5/232* (2006.01)
(Continued)

(52) U.S. Cl.
CPC ............. *G02B 27/646* (2013.01); *G02B 7/09* (2013.01); *G02B 13/009* (2013.01); *G03B 5/00* (2013.01); *H04N 5/2254* (2013.01); *H04N 5/2257* (2013.01); *H04N 5/23216* (2013.01); *H04N 5/23258* (2013.01); *H04N 5/23287* (2013.01);
(Continued)

(58) Field of Classification Search
CPC ............... H04N 5/2254; H04N 5/2257; H04N 5/23216; H04N 5/23212; H04N 5/23258; H04N 5/23287; G02B 27/646; G02B 7/09; G02B 13/009; G03B 5/00; G03B 2205/0007; G03B 2205/0023; G03B 2205/0069
See application file for complete search history.

(56) References Cited

U.S. PATENT DOCUMENTS 8,363,150 B2 *  1/2013  Ming ..................... G02B 7/08
                                                  348/208.11
2010/0128133 A1   5/2010  Lee et al.
(Continued)

FOREIGN PATENT DOCUMENTS

EP    2 046 018 A1   4/2009
JP    2011-081058 A   4/2011
(Continued)

OTHER PUBLICATIONS

European Search Report dated Oct. 11, 2018, 2018, issued in European Application No. 16857749.2.

*Primary Examiner* — Lin Ye
*Assistant Examiner* — Chriss S Yoder, III
(74) *Attorney, Agent, or Firm* — Jefferson IP Law, LLP

(57) ABSTRACT

A method and a camera including a stabilizer are provided. The camera includes a lens, at least one autofocus (AF) actuator for moving the lens in a first direction, and at least one optical image stabilization (OIS) stabilizer for moving the lens in at least one direction. The OIS stabilizer may be connected with the AF actuator and arranged not to be stacked over the AF actuator in the first direction.

48 Claims, 26 Drawing Sheets

(51) Int. Cl.
*G02B 7/09* (2006.01)
*G03B 5/00* (2006.01)
*H04N 5/225* (2006.01)
*G02B 13/00* (2006.01)

(52) U.S. Cl.
CPC ............ *G03B 2205/0007* (2013.01); *G03B 2205/0023* (2013.01); *G03B 2205/0069* (2013.01); *H04N 5/23212* (2013.01)

(56) References Cited

U.S. PATENT DOCUMENTS

| | | |
|---|---|---|
| 2010/0128371 A1 | 5/2010 | Yoon et al. |
| 2014/0009631 A1 | 1/2014 | Topliss |
| 2014/0255016 A1 | 9/2014 | Kim et al. |
| 2015/0103195 A1 | 4/2015 | Kwon et al. |

FOREIGN PATENT DOCUMENTS

| | | |
|---|---|---|
| KR | 10-2009-0131452 A | 12/2009 |
| KR | 10-2012-0097122 A | 9/2012 |
| KR | 10-2014-0110381 A | 9/2014 |
| KR | 10-2015-0013555 A | 2/2015 |
| KR | 10-2015-0042681 A | 4/2015 |

\* cited by examiner

CAMERA MODULE HAVING STABILIZER AND ELECTRONIC DEVICE INCLUDING THE SAME

CROSS-REFERENCE TO RELATED APPLICATION(S)

This application claims the benefit under 35 U.S.C. § 119(a) of a Korean patent application filed on Oct. 20, 2015 in the Korean Intellectual Property Office and assigned Serial number 10-2015-0146195, the entire disclosure of which is hereby incorporated by reference.

TECHNICAL FIELD

The present disclosure relates to camera modules equipped in portable electronic devices.

BACKGROUND

With the development of mobile communication technology, the trend is for smartphones or other portable terminals to include one or more compact, lightweight camera modules.

Recent portable terminals require high-capability, high-performance camera modules, and digital single-lens reflex (DSLR)-class, multifunctional camera modules are in vigorous development accordingly. A diversity of functions offered by camera modules equipped with portable transparent electrodes encompass autofocus (AF), zoom, and anti-shake or anti-vibration.

Anti-shake or image stabilization is technology that compensates for an image blur caused by the user's hand movement or vibration of the body of the portable terminal while image capturing. Anti-shake is enabled by detecting vibration to an electronic device, e.g., camera, through multiple angular velocity sensors equipped in the electronic device and moving the lens or image sensor according to the angular velocity and direction of the detected vibration.

In stabilizers according to the related art equipped in camera modules, a lens unit and multiple wire springs, which are elastic members for fastening a carrier for movement, are symmetrically arranged, and an elastic member (e.g., a wire spring or leaf spring) for fastening a moving unit for moving the lens unit onto a supporting structure is used to move the lens unit in upper, lower, left, and right directions (X and Y axes) in a position perpendicular to the optical axis (Z axis). Power may be applied to the wire spring to control the length of the wire. The camera modules are configured in such a manner that a stabilizer is attached to an autofocus (AF) device.

The above information is presented as background information only to assist with an understanding of the present disclosure. No determination has been made, and no assertion is made, as to whether any of the above might be applicable as prior art with regard to the present disclosure.

SUMMARY

Camera modules with a stabilizer perform accurate anti-shake using at least two or more perpendicular resultant forces for anti-shake, but under such situation where the number or size of actuator should be minimized, accurate and rapid anti-shake may be difficult to achieve. That is, anti-shake driving controlled by resultant forces in at least two or more directions may be accomplished in a larger range than is required while the resultant forces act or may cause excessive unnecessary rotation. This may deteriorate the accuracy and velocity of anti-shake driving and needs to be mitigated for speedy anti-shake driving.

The elastic members of the camera module according to the related art may be manufactured of metal wire springs or plate-type springs. The elastic members are configured so that four wire springs are symmetrically arranged, and these wire springs connect the supporting structure with the moving unit to limit the movement along the optical axis direction and to enable movement along X and Y axes (X-axis and Y-axis). However, the symmetrical structure on the X and Y axes planes of the wire springs take up a predetermined physical space, limiting its downsizing. Further, leaf springs require a preload for constant support in the Z axis (Z-axis) direction, causing them to occupy a predetermined space in the Z axis direction.

As such, such camera modules according to the related art are structured so that the autofocus (AF) actuator is stacked on the optical image stabilization (OIS) actuator/stabilizer, and the AF actuator imposes a limitation on reducing the height.

That is, the one-above-another stacked arrangement of AF actuator and OIS actuator in the camera module according to the related art may result in the product thickening or being bulky.

According to embodiments of the present disclosure, there are camera modules having the OIS actuator and AF actuator arranged in parallel on a side surface of the lens unit to enable the slim down of the overall product.

Aspects of the present disclosure are to address at least the above-mentioned problems and/or disadvantages and to provide at least the advantages described below. Accordingly, an aspect of the present disclosure is to provide a camera module comprising a lens unit or device, at least one AF actuator for moving the lens unit in a first direction, and at least one OIS stabilizer for moving the lens unit in at least one direction, wherein the OIS stabilizer may be connected with the AF actuator not to be stacked over the AF actuator in the first direction.

The at least one OIS stabilizer may include the coupling unit or device coupling with the at least one AF actuator on a surface thereof, and as the at least one AF actuator moves in the first direction (Z axis), the at least one AF actuator may be configured to move in the first direction (Z axis) as well.

The at least one OIS stabilizer may include a base, a moving unit or device for moving in a second direction (X and Y axes), and at least one actuator connected with the base and the moving unit and configured to move the moving unit in the second direction (X and Y axes).

The at least one actuator may include a first sub actuator and a second sub actuator, the second direction (X and Y axes) may include a first sub direction (X axis) and a second sub direction (Y axis), and the first sub actuator may be configured to move the moving unit in the first sub direction (X axis), and the second sub actuator may be configured to move the moving unit in the second sub direction (Y axis).

The at least one OIS stabilizer may include a yolk connected with the moving unit and at least one magnet connected with the base, and the camera module may be configured to use the yolk and the at least one magnet to move the moving unit in the second direction (X and Y axes).

The at least one OIS stabilizer may further include at least one ball provided to reduce a frictional force between the moving unit and the base.

The at least one actuator may include a shape memory alloy (SMA).

The at least one optical axis may include a board for supplying power to the actuator.

The at least one OIS stabilizer may include a location sensor for detecting a movement location of the moving unit.

The at least one OIS stabilizer may include a first OIS stabilizer and a second OIS stabilizer, and the second direction (X and Y axes) may include a first sub direction (X axis) and a second sub direction (Y axis), and the first OIS stabilizer may be configured to move the lens unit in the first sub direction (X axis), and the second OIS stabilizer may be configured to move the lens unit in the second sub direction (Y axis).

The at least one OIS stabilizer may be configured to receive a portion of power through the AF actuator.

In accordance with an aspect of the present disclosure, a camera module is provided. The camera module includes a lens unit, an AF actuator actuating the lens unit along an optical axis (Z axis), and a first and second OIS stabilizer actuating the lens unit in a first and second direction (X and Y axes) on a plane perpendicular to the optical axis (Z axis) to compensate for a shake of the lens unit, and the first and second OIS stabilizer and the AF actuator may be disposed on side surfaces, respectively, of the lens unit.

In accordance with another aspect of the present disclosure, a camera module is provided. The camera module includes a lens unit, a first OIS stabilizer provided on a side surface of the lens unit and actuating the lens unit in a first direction (X axis) to compensate for a shake of the lens unit, a second OIS stabilizer provided on a side surface of the lens unit and coupled with the first OIS stabilizer and actuating the lens unit in a second direction (Y axis) to compensate for a shake of the lens unit, and an AF actuator provided on a side surface of the first and second OIS stabilizer to actuate the lens unit along the optical axis (Z axis).

In accordance with another aspect of the present disclosure, a camera module is provided. The camera module includes a lens unit or device, an autofocus (AF) actuator connected with the lens unit in a first direction, an optical image stabilization (OIS) stabilizer connected with the AF actuator in a second direction, and at least one processor, and the at least one processor may be configured to move the lens unit in the first direction using the AF actuator at least based on a location of an external object, move the lens unit in the second direction using the OIS stabilizer at least based on a movement of the electronic device, and obtain at least one image for the external object using the lens unit.

In accordance with another aspect of the present disclosure, a method performed by an electronic device is provided. The method includes a camera module comprising a lens unit or device, an AF actuator connected with the lens unit in a first direction, and an OIS stabilizer connected with the AF actuator in a second direction may comprise moving the lens unit in the first direction using the AF actuator at least based on a location between an external object and the electronic device and moving the lens unit in the second direction using the OIS stabilizer at least based on a movement of the electronic device.

According to an embodiment of the present disclosure, e.g., the OIS stabilizer and AF actuator are arranged in parallel on a side surface of the lens unit, to enable the further slimming down of the overall device or product.

According to an embodiment of the present disclosure, e.g., a magnet and yolk may be provided in the OIS stabilizer and positioned at the central portion in the optical axis (Z axis) direction, and no elastic member is required for holding the lens unit at the central position as contrasted to or unlike the prior art, allowing for free movement along the X and Y axes on the vertical plane, as well as enabling the product to be manufactured to be more compact and slimmer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
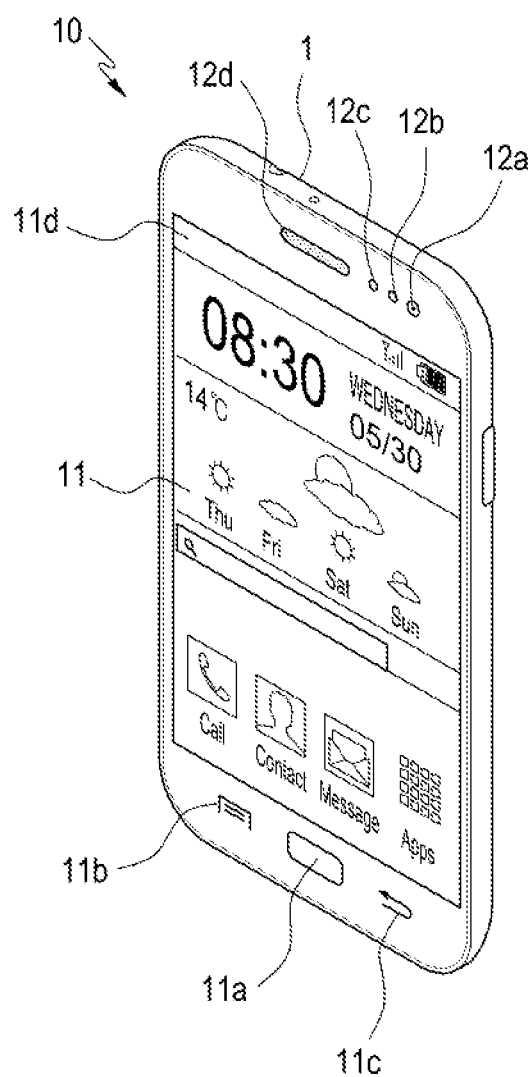
FIG. 1 is a perspective view illustrating a front surface of an electronic device having a camera module according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. Examples of the home appliance may include at least one of a television (TV), a digital video disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of a piece of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

Figure 2:
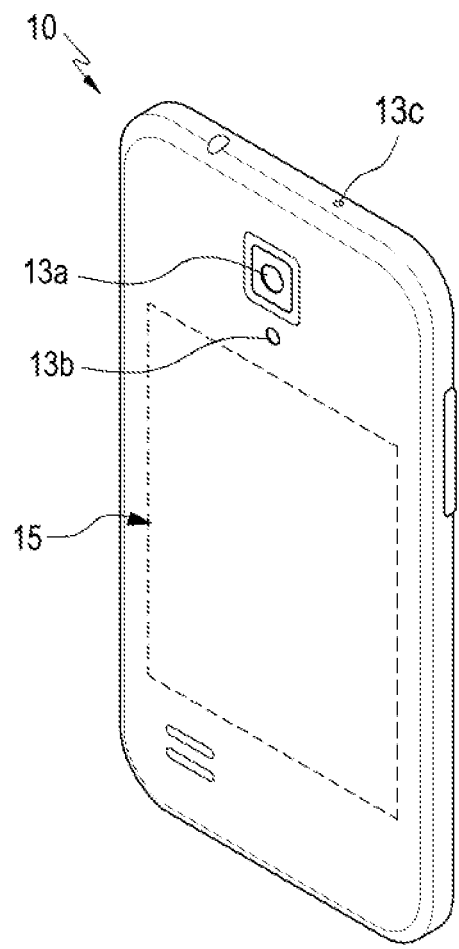
FIG. 2 is a perspective view illustrating a rear surface of an electronic device having a camera module according to an embodiment of the present disclosure.

FIG. 1 is a perspective view illustrating a front surface of an electronic device according to an embodiment of the present disclosure. FIG. 2 is a perspective view illustrating a rear surface of the electronic device according to an embodiment of the present disclosure. The electronic device 10 may be a smartphone or a wearable device. Constitutional parts of the electronic device, such as a smartphone, are described with reference to FIGS. 1 and 2.

Referring to FIG. 1, a touch screen 11 may be provided at the center of the front surface of the electronic device 10. The touch screen 11 may occupy most of the front surface of the electronic device 10. FIG. 1 illustrates an example in which a main home screen is displayed on the touch screen 11. The main home screen is a screen that is first to be displayed on the touch screen 11 when the electronic device 10 is powered on. When the electronic device 10 has several pages of different home screens, the main home screen may be the first one of the home screens. The home screen may show up on short-key icons, a main menu shifting key for running applications frequently used, time, and weather. The main menu shifting key may display a menu on the touch screen 11. On the top of the touch screen 11 may be provided a status bar 11d including battery recharge state, signal reception strength, and current time. A home key 11a, a menu button 11b, and a go-back button 11c may be provided on a lower portion of the touch screen 11.

The home key 11a may display the main home screen on the touch screen 11. For example, when the home button 11a is touched while the main home screen and other home screens or menu are in display on the touch screen 11, the main home screen may show up on the touch screen 11. When the home key 11a is touched while applications are running on the touch screen 11, the main home screen may be displayed on the touch screen 11. The home key 11a may be used to display applications recently used or a task manager on the touch screen 11. The menu button 11b may provide a connection menu that may be used on the touch screen 11. The connection menu may include an add widget menu, a change background menu, a search menu, an edit menu, and a setting menu. The go-back button 11c may display the screen displayed immediately before the screen currently in execution or may terminate the latest application used.

According to an embodiment of the present disclosure, as mentioned above in connection with FIG. 1, a first camera 12a, an illumination sensor 12b, a proximity sensor 12c, or a speaker 12d may provide in an upper area of the front surface of the electronic device 10.

Referring to FIG. 2, a second camera 13a, a flash 13b or a speaker 13c may be provided in the rear surface of the electronic device 10. When the electronic device 10 is configured with a detachable battery, a battery cover 15 may form the rear surface of the electronic device 10.

Figure 3:
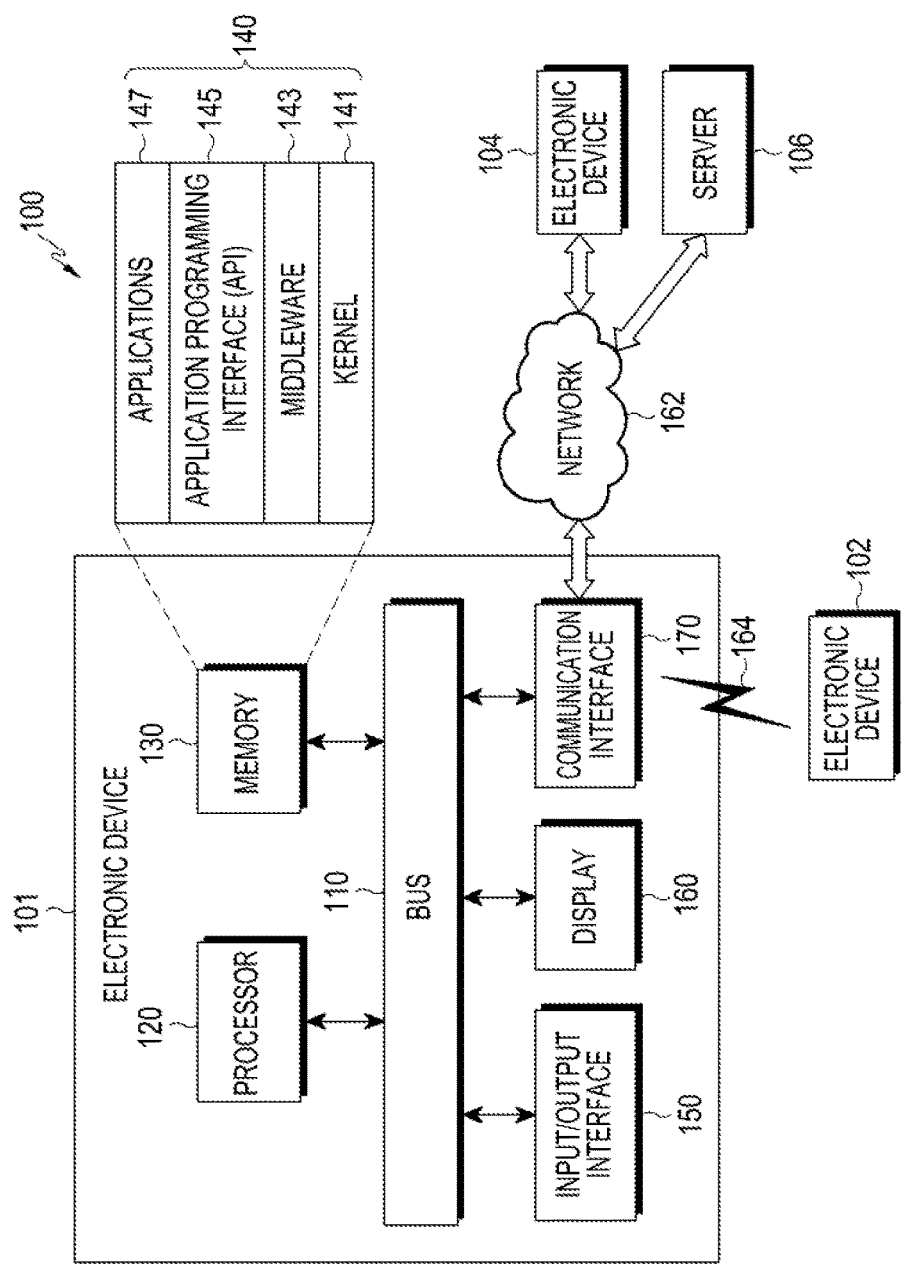
FIG. 3 is a block diagram illustrating a network environment including an electronic device according to an embodiment of the present disclosure.

FIG. 3 is a block diagram illustrating a network environment including an electronic device according to an embodiment of the present disclosure.

Referring to FIG. 3, according to an embodiment of the present disclosure, an electronic device 101 (e.g., the electronic device 10 shown in FIG. 1) is included in a network environment 100. The electronic device 101 may include a bus 110, a processor 120, a memory 130, an input/output interface 150, a display 160, and a communication interface 170. In some embodiments, the electronic device 10 may exclude at least one of the components or may add another component.

The bus 110 may include a circuit for connecting the components 110 to 170 with one another and transferring communications (e.g., control messages and/or data) between the components.

The processing module 120 may include one or more of a central processing unit (CPU), an application processor (AP), or a communication processor (CP). The processor 120 may perform control on at least one of the other components of the electronic device 10, and/or perform an operation or data processing relating to communication.

The memory 130 may include a volatile and/or non-volatile memory. For example, the memory 130 may store commands or data related to at least one other component of the electronic device 10. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 in order of priority. For example, the middleware 143 may assign at least one of application programs 147 with priority of using system resources (e.g., the bus 110, processor 120, or memory 130) of at least one electronic device 10. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to another component(s) of the electronic device 10. Further, the input/output interface 150 may output commands or data received from another component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device.

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of wireless fidelity (Wi-Fi), Bluetooth (BT), near-field communication (NFC), or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 10. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 10 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 10. The electronic device 101 may provide a requested function or service by processing the received result as it is or additionally. To that end, a cloud computing, distributed computing, or client-server computing technique may be used, for example.

The electronic device 101 described below may be any one of the above-mentioned wearable device, laptop computer, net book, smartphone, tablet personal computer (PC), GalaxyTAB™, iPad®, and wireless charger. In this embodiment, the electronic device may be the smartphone.

According to an embodiment of the present disclosure, the wireless charger denotes a device that wirelessly transmits and receives power in a short range to charge the electronic device.

Further, the display unit of the electronic device may be rendered to have a minimized bezel area to enlarge the display unit, present a gorgeous design, provide a flexible display unit, or implement a convex or concave display unit.

That is, a surrounding portion of the display unit may be bent allowing the view area to be expanded to a side portion and used. As the view area of the display unit is bent to expand up to the side portion, the view area may be used enlarged, or a separate screen in the side portion may be used, a more gorgeous look may be presented in light of design. According to an embodiment of the present disclosure, the display unit may include a first screen view area and a second view area provided at both sides of the first view area.

Further, the camera device or camera module 400 applied to the electronic device 10 (e.g., the electronic device 101 shown in FIG. 3) may include any one of a camera module having anti-shake or anti-vibration functionality, a voice coil motor (VCM)-type camera module, and an encoder-type camera module. In this embodiment, although the above-enumerated camera modules are described as the camera module as an example, the present disclosure is not limited thereto. That is, as the camera module 400, any other various camera modules may apply which actuate the lens carrier by an actuator. Here, in this embodiment, the camera module 400 is described as being of VCM type or having anti-shake functionality.

According to an embodiment of the present disclosure, a configuration of the camera module 400 in the electronic device 10 is described below in more detail.

Figure 4:
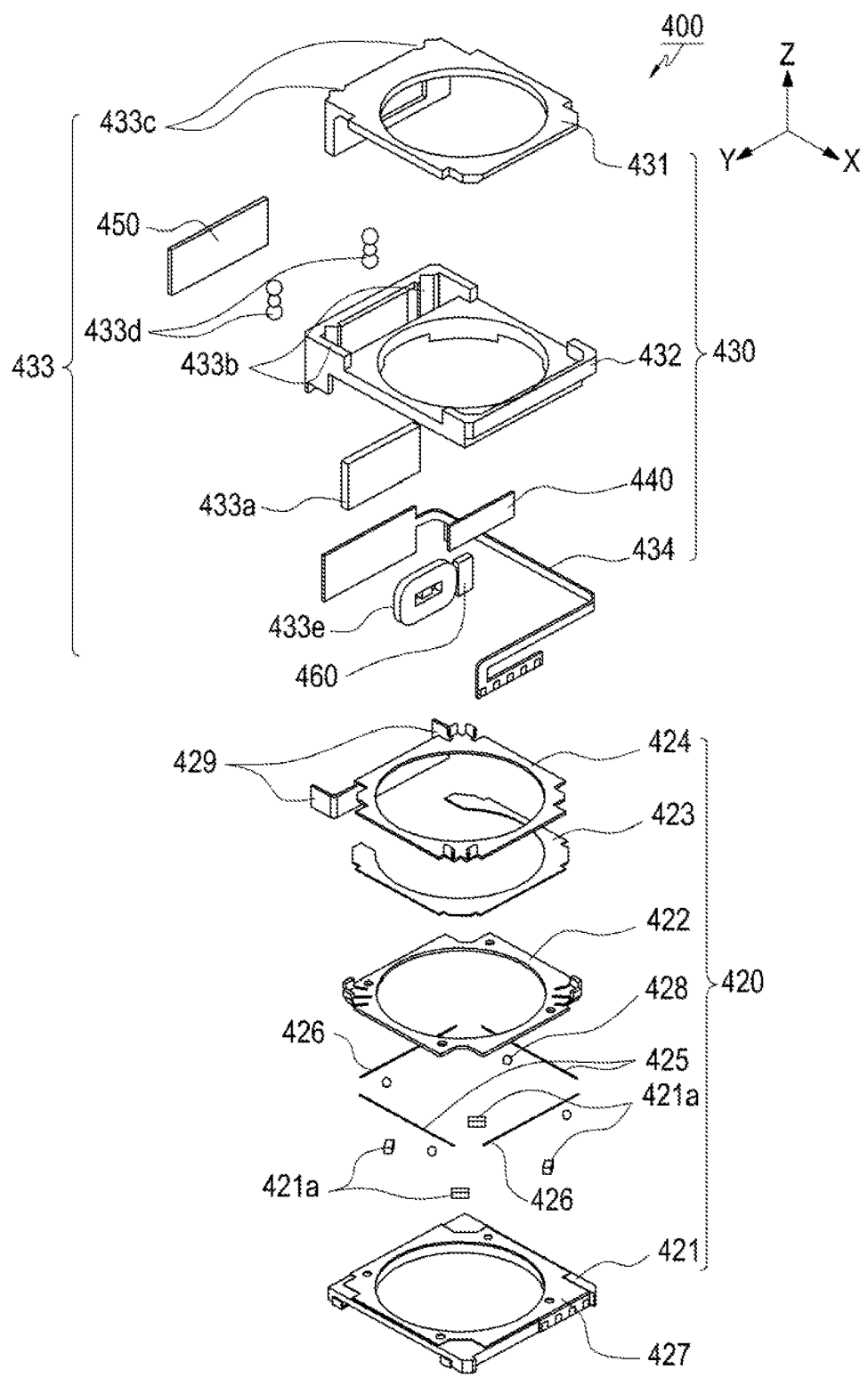
FIG. 4 is an exploded perspective view illustrating a configuration of a camera module according to an embodiment of the present disclosure.

FIG. 4 is an exploded perspective view illustrating a configuration of a camera module 400 according to an embodiment of the present disclosure.

Figure 16:
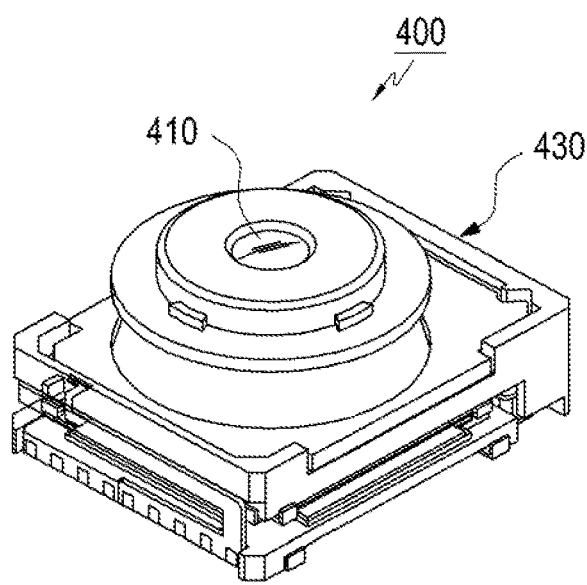
FIG. 16 is a perspective view illustrating a coupled state of a camera module according to an embodiment of the present disclosure.
Figure 17:
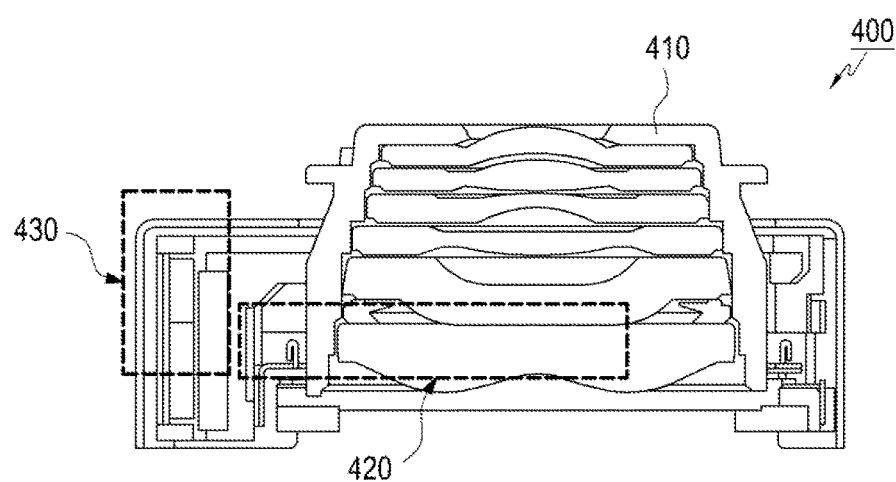
FIG. 17 is a side cross-sectional view illustrating a coupled state of a camera module according to an embodiment of the present disclosure.

The camera module 400 may include, e.g., a lens unit 410 (as shown in FIGS. 16 and 17), an optical image stabilization (OIS) stabilizer 420, and an autofocus (AF) actuator 430. The lens unit 410 may be actuated by the OIS stabilizer 420 or AF actuator 430 in a first direction (e.g., Z axis) or second direction (e.g., X or Y axis). The OIS stabilizer 420 may be provided in the lens unit 410 to actuate in the second direction (e.g., X or Y axis) to compensate for shake of the lens unit 410. The AF actuator 430 may be provided on a side surface of the OIS stabilizer 420 to actuate the lens unit 410 in the first direction (e.g., Z axis). According to an embodiment of the present disclosure, the OIS stabilizer 420 may include at least one magnet 421a and at least one yolk 423 and configured to position the lens unit 410 at the center portion of the first direction (Z axis) by the magnetic force of the magnet and yolk.

The Z axis direction is provided as an example of the first direction, but the first direction may be a direction other than the Z axis direction. Likewise, the second direction may be a direction other than the X or Y axis direction.

According to an embodiment of the present disclosure, the first direction may be denoted 'Z axis direction,' and the second direction may be denoted "X or Y axis direction."

The second direction (X or Y axis) may include a first sub direction (X axis) and a second sub direction (Y axis). As such, the OIS stabilizer 420 and the AF actuator 430 may be arranged in parallel along the side surface of the lens unit 410 in contrast to the serial arrangement according to the related art, thus allowing the product to be more compact or slimmer.

According to an embodiment of the present disclosure, the OIS stabilizer 420 and the AF actuator 430 may be asymmetrically arranged with respect to the first direction (Z axis). A surface of a moving unit 424 may have a coupling unit 429 extending from the surface of the moving unit 424 and coupled with the AF actuator 430.

Figure 5:
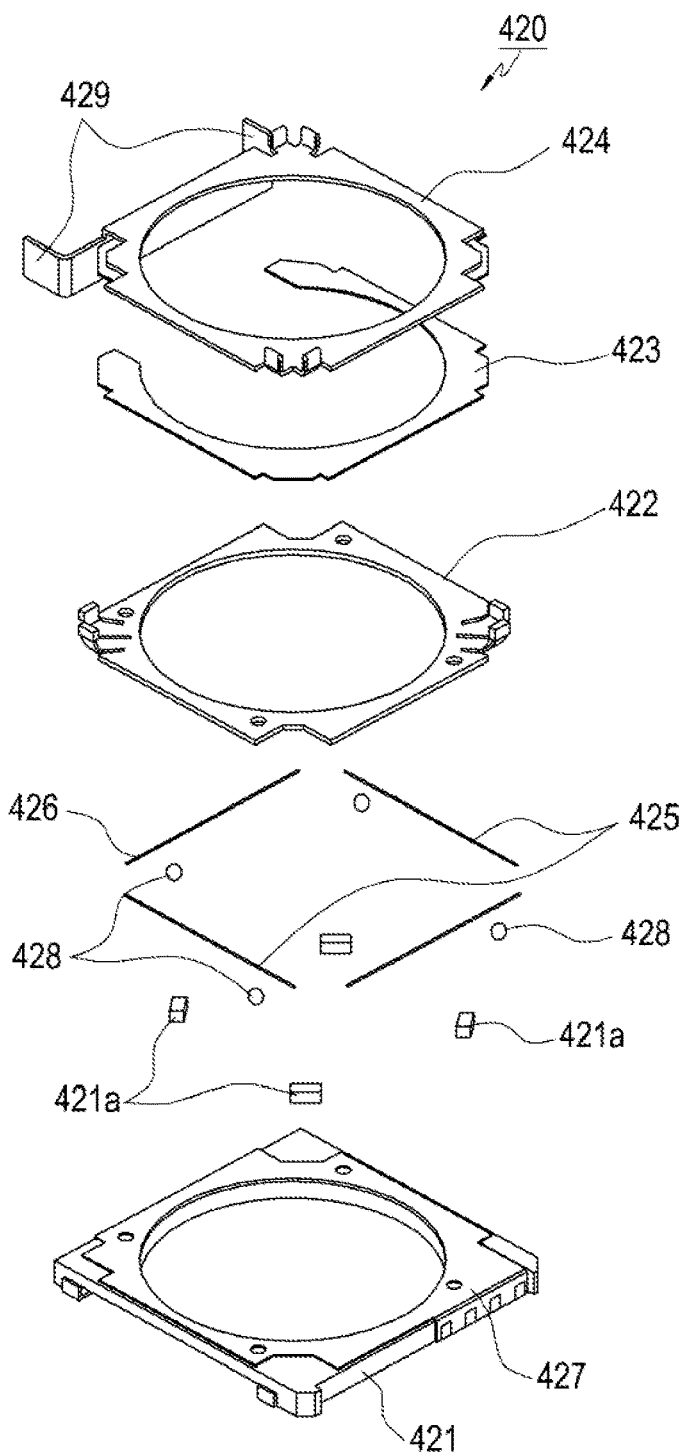
FIG. 5 is an exploded perspective view illustrating a configuration of an optical image stabilization (OIS) stabilizer among components of a camera module according to an embodiment of the present disclosure.
Figure 6:
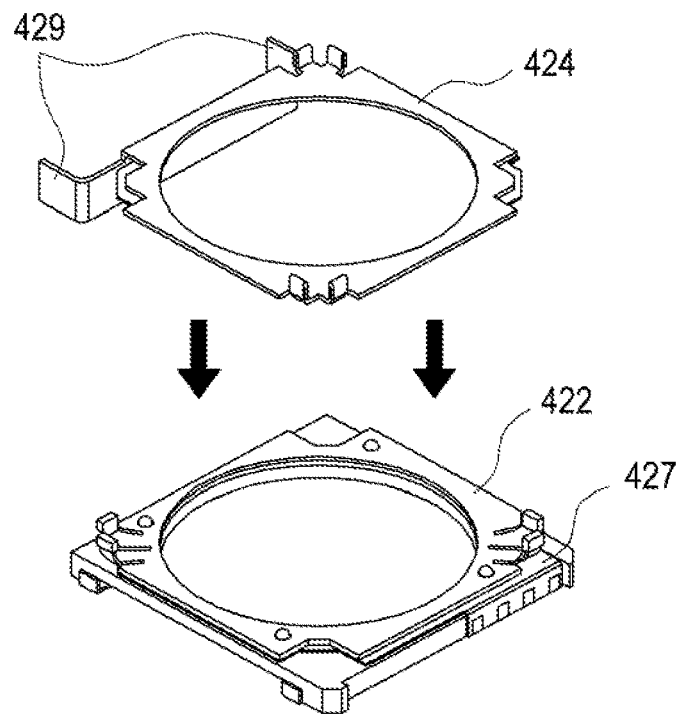
FIG. 6 is a perspective view illustrating a state before an OIS stabilizer among components of a camera module is coupled according to an embodiment of the present disclosure.
Figure 7:
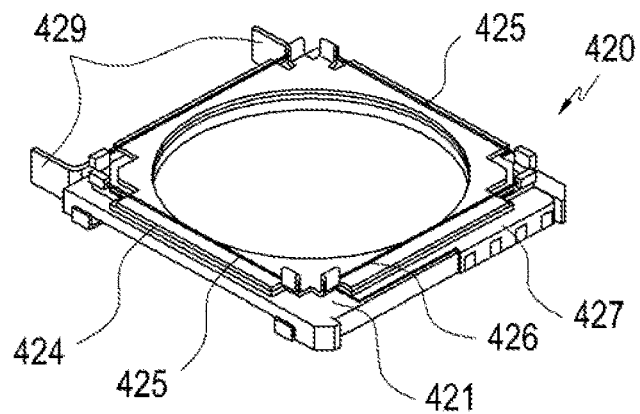
FIG. 7 is a perspective view illustrating a state in which an OIS stabilizer among components of a camera module is coupled according to an embodiment of the present disclosure.

A configuration of the OIS stabilizer 420 is described in greater detail. FIG. 5 is an exploded perspective view illustrating a configuration of an OIS stabilizer among components of a camera module according to an embodiment of the present disclosure. FIG. 6 is a perspective view illustrating a state before an OIS stabilizer among components of a camera module is coupled according to an embodiment of the present disclosure. FIG. 7 is a perspective view illustrating a state in which an OIS stabilizer among components of a camera module is coupled according to an embodiment of the present disclosure.

Referring to FIG. 5, the OIS stabilizer 420 may include, e.g., a base 421, a moving unit 424, and at least one actuator. A surface (e.g., a top surface) of the base 421 may include a fastening unit 422, a yolk 423, the moving unit 424, the actuator, and a first board (e.g., a flexible circuit board) 427 which are described below. The moving unit 424 may be configured to move in the second direction (X or Y axis) perpendicular to the first direction (Z axis). The actuator may be configured to move the moving unit 424 in the second direction (X or Y axis). Further, a surface (e.g., top surface) of the base 421 may have a plurality of magnets 421a and the first board (e.g., flexible circuit board) 427 mounted thereon.

Referring to FIGS. 6 and 7, the actuator may include a first sub actuator 425 and a second sub actuator 426, and the first sub actuator 425 may be connected to the fastening unit 422 and the moving unit 424 to be powered to move the moving unit 424 in the first sub direction (X axis). The second sub actuator 426 may be connected to the fastening unit 422 and the moving unit 424 to be powered to control length and move the moving unit 424 in the second sub direction (Y axis).

According to an embodiment of the present disclosure, the fastening unit 422 may be fastened to a surface (e.g., top surface) of the base 421 to support and actuate the first and second sub actuator 425 and 426 in the first and second sub direction (X and Y axes). The yolk 423 may be provided at an upper side of the fastening unit 422 to face the magnets 421a and to position and hold the lens unit 410 at the center portion of the first direction (Z axis) by the magnetic force of the magnets. The moving unit 424 may be provided at an upper side of the yolk 423 to move in the first or second sub direction (X or Y axis) perpendicular to the first direction (Z axis). The first board (e.g., flexible circuit board) 427 may be provided on at least one surface (e.g., top surface) of the base 421 to electrically connect and simultaneously supply power to the first and second sub actuator 425 and 426.

That is, as first ends of the first and second sub actuator 425 and 426 may be coupled to the fastening unit 422, and second ends of the first and second sub actuator 425 and 426 may be coupled to the moving unit 424, the moving unit 424 may be supported while moved in the first and second sub direction (X and Y axes) by the first and second sub actuator 425 and 426.

According to an embodiment of the present disclosure, the base 421 may include at least one ball 428 to reduce friction force between the moving unit 424 and the base. That is, at least one or more balls 428 may be used as a method for reducing frictional force between the moving unit 424 and the base 421 or enabling smooth or rolling movement thereof.

According to an embodiment of the present disclosure, the first and second sub actuator 425 and 426 may be any one of wire springs and leaf springs. The first and second sub actuator 425 and 426 may also adopt other types of springs other than wire springs or leaf springs. In this embodiment, adopting wire springs is described.

The first and second sub actuator 425 and 426 may be formed of a shape memory alloy (SMA). In this embodiment, although the first and second sub actuator 125 and 126 is described as being formed of SMA, the present disclosure is not limited thereto. That is, the first and second sub actuator 425 and 426 may be formed of any other various materials that may control length when powered.

The SMA denotes an alloy that has different crystal arrangements at a higher temperature and lower temperature (e.g., room temperature), respectively, and although transformed at a lower temperature, may be back to the shape at the higher temperature by heating at a predetermined temperature or higher. According to an embodiment of the present disclosure, the first and second sub actuator 425 and 426, when powered and thus heated, is changed in length, allowing the moving unit 424 to move in the first and second sub direction (X and Y axes).

According to an embodiment of the present disclosure, the base 421 may have at least one location sensor (not shown) to detect the shake movement location of the moving unit 424. The location sensor may include an anti-shake-side location sensor.

According to an embodiment of the present disclosure, the location sensor (not shown) may be, e.g., a hall sensor. An actuating circuit unit (not shown) provided in the electronic device 10 may apply an actuation signal for anti-shake to each coil based on vibration information detected through, e.g., an angular velocity sensor in the electronic device, e.g., information on the amount and direction of vibration, and location information on the OIS stabilizer 420 detected from the location sensor. The actuation signal may include power or current.

Further, a board (e.g., printed circuit board) (not shown) having an image sensor (not shown) may be provided at a lower side of the base 421.

Figure 8:
FIG. 8 is a side view illustrating a magnet and location sensor among components of a camera module according to an embodiment of the present disclosure.

FIG. 8 is a side cross-sectional view illustrating an arrangement of a magnet 4201 and location sensor (not shown) according to an embodiment of the present disclosure.

Referring to FIG. 8, e.g., the magnet 4201 may be disposed at an upper side of the moving unit 424, and the location sensor (not shown) may be located at a lower side of the base 421. The location sensor (not shown) may be disposed to face the magnet 4201 to detect the movement and variation in magnetic field of the first and second sub actuator 425 and 426 of the OIS stabilizer. That is, the location sensor (not shown) may detect a variation in magnetic field of the magnet and yolk to easily detect the location of the moving unit 124.

Figure 9:
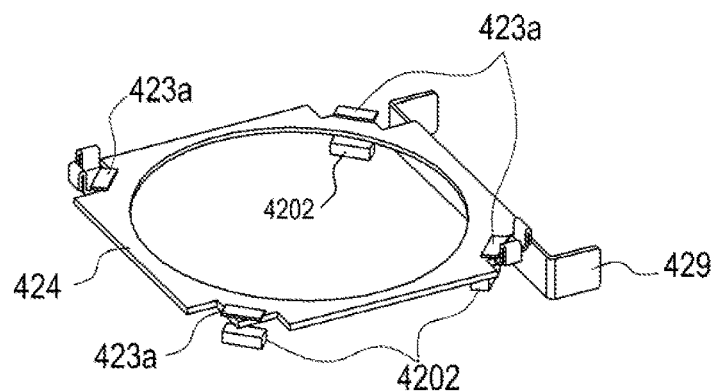
FIG. 9 is a perspective view illustrating a magnet and yolk of an OIS stabilizer among components of a camera module according to an embodiment of the present disclosure.
Figure 10:
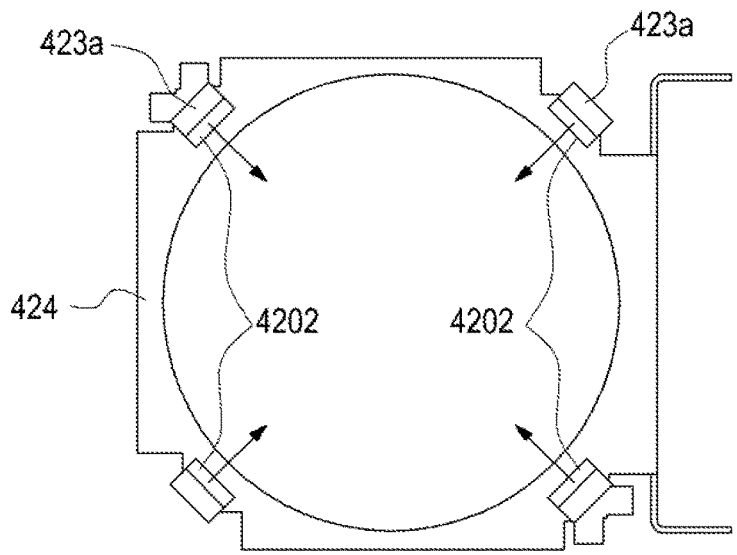
FIG. 10 is a plan view illustrating a magnet and yolk of an OIS stabilizer among components of a camera module according to an embodiment of the present disclosure.
Figure 11:
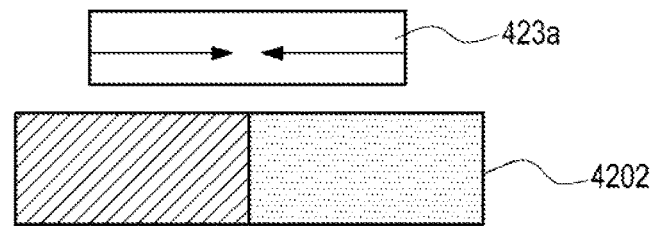
FIG. 11 is a side view illustrating an operation state of a magnet and yolk of an OIS stabilizer among components of a camera module according to an embodiment of the present disclosure.

FIG. 9 is a perspective view illustrating a magnet and yolk of an in operation among components of a camera module according to an embodiment of the present disclosure. FIG. 10 is a plan view illustrating a magnet and yolk of an in operation among components of a camera module according to an embodiment of the present disclosure. FIG. 11 is a side view illustrating an operation state of a magnet and yolk of an in operation among components of a camera module according to an embodiment of the present disclosure.

Referring to FIGS. 9 to 11, the magnet 4202 may be disposed, e.g., at a lower side of the moving unit 424, and the yolk 423a may be disposed in the fastening unit 422 while facing the magnet 4202. Accordingly, the yolk 423a and the magnet 4202 may leave the lens unit 410 to be positioned at the center portion using the magnetic spring phenomenon by the attracting force between the yolk and magnet. Accordingly, when the lens unit 410 is off the central position when actuated, it may be back to its original position with respect to the first direction (Z axis) by the magnetic force of the magnet and yolk.

According to an embodiment of the present disclosure, the magnet 4202 and yolk 423a, after initial alignment of the camera module 400, may fasten and hold the lens unit 410 at the center of the first direction (Z axis).

Figure 12:
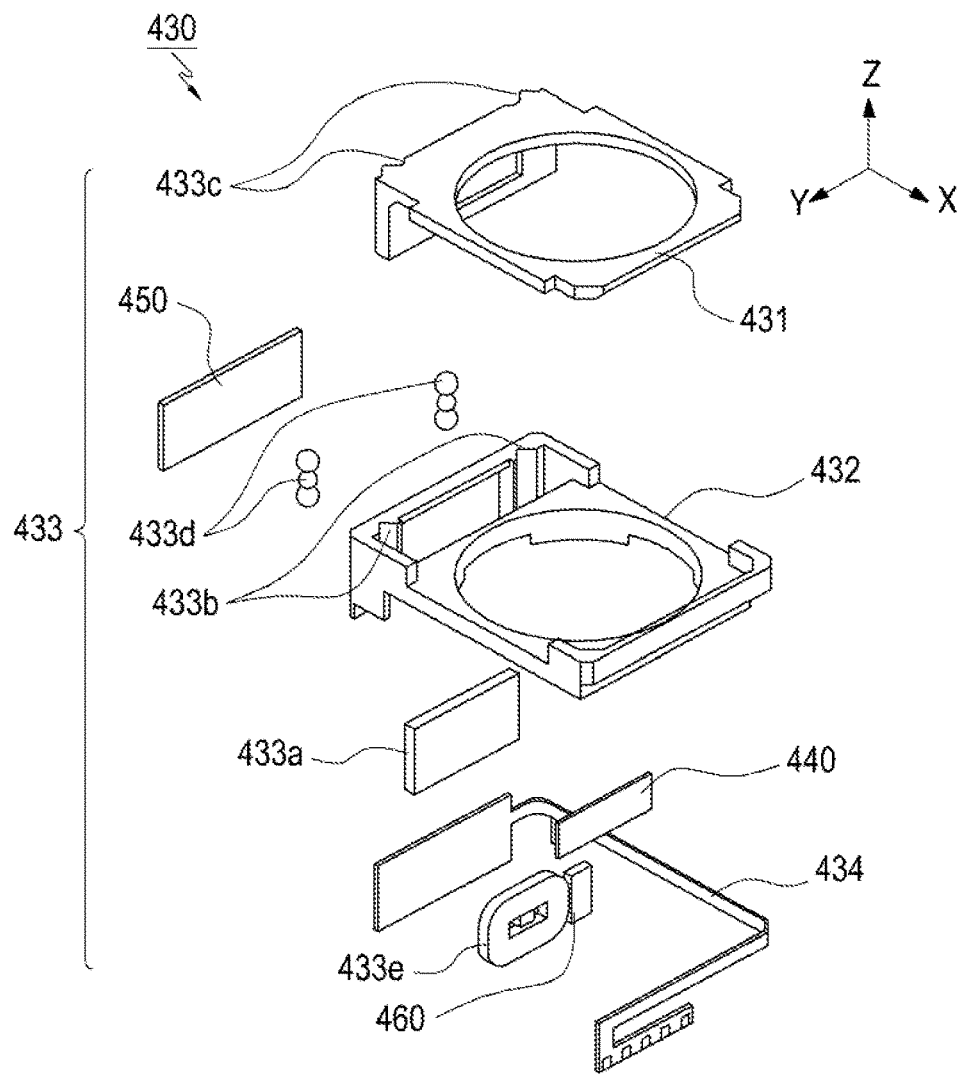
FIG. 12 is an exploded perspective view illustrating a configuration of an autofocus (AF) actuator among components of a camera module according to an embodiment of the present disclosure.

The configuration of the AF actuator 430 is described in further detail. FIG. 12 is an exploded perspective view illustrating a configuration of an AF actuator 430 among components of a camera module according to an embodiment of the present disclosure.

Referring to FIG. 12, the AF actuator 430 may include, e.g., a lens carrier 431 having a lens unit 410, a lens housing 432, a first direction (Z axis) moving unit 433, and a second board (e.g., flexible circuit board) 434. The lens housing 432 may be coupled with the lens carrier 431. The first direction moving unit 433 may be provided on a side surface of the lens housing 432 to move the lens carrier 431 in the first direction (Z axis) when powered. The second board (e.g., flexible circuit board) 434 may be provided in the lens housing 432 to supply power to a coil of the first direction moving unit 433, which is described below, while electrically connected with the coil. A further detailed description is given with reference to FIG. 12. The first direction moving unit 433 may include an autofocusing (AF)-side magnet 433a, a first and second guide member 433b and 433c, and multiple ball bearings 433d. According to an embodiment of the present disclosure, the AF-side magnet 433a may be provided on a side surface of the lens carrier 431 to face the coil of the second board (e.g., flexible circuit board) 434. The first guide member 433b may have the coil 433e and may be provided on a side surface of the lens housing to allow the coil to face the AF-side magnet 433a, and when powered, move the lens carrier 431 in the first direction (Z axis). In an embodiment, the second guide member 433c may be provided on a side surface of the lens carrier 431 to face the first guide member 433b while moving the lens carrier 431 in the first direction. The ball bearings 433d may be provided between the first and second guide member 433b and 433c to move the lens carrier 431.

In one embodiment, in the first direction moving unit 433, when power is applied to the coil 433e, the lens carrier 431 may be moved by the first and second guide member 433b by the magnetic force generated between the magnets 421a and the coil 433e to actuate in the first direction (Z axis). The first guide member 433b has a first yolk 440 disposed to face the magnet 421a with the coil 433e disposed therebetween. The second guide member 433c may include a second yolk 450 disposed to face the coil 433e with the AF-side magnet 433a disposed therebetween. In one embodiment, the first direction moving unit 433 may include at least one location sensor 460 to detect a movement position of the first direction moving unit 433. The location sensor 460 may include an AF-side location sensor.

That is, an actuating circuit unit (not shown) in the electronic device may apply an actuation signal for focusing to the coil based on focusing state information provided through a separate route and location information on the first direction moving unit 433 detected by the location sensor 460. The actuation signal may include power or current. Assembling the camera module 400 is described with reference to FIG. 4 according to an embodiment of the present disclosure.

Figure 14:
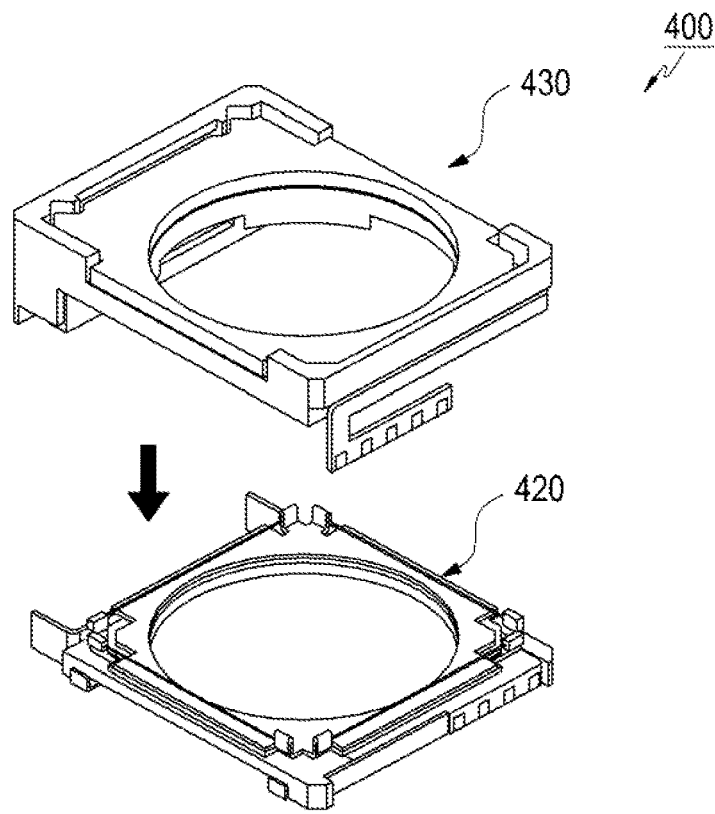
FIG. 14 is a perspective view illustrating a state before an OIS stabilizer and AF actuator among components of a camera module are coupled according to an embodiment of the present disclosure.

Referring to FIGS. 4 and 14, a plurality of magnets 421a may be provided on a top surface of the base 421, a first board (e.g., flexible circuit board) 427 may be provided on the top surface of the base 421, and multiple balls 428 may be provided on the top surface of the base 421. In one embodiment, the fastening unit 422 may be provided on the top surface of the base 421, and the fastening unit 422 may be provided on the base 421 while coupled with the balls 428 provided on the base 421 in a pass-through manner A yolk 423 may be provided on the fastening unit 422, and a moving unit 424 may be provided on the yolk 423. Here, first ends of the first and second sub actuator 425 and 426 may be coupled to the fastening unit 422, and second ends of the first and second sub actuator 425 and 426 may be coupled to the moving unit 424. The yolk 423 may face the magnets 421a and position and hold the lens unit 410 at the center portion of the first direction (Z axis) while maintaining the initial position by the magnetic force of the magnets. As such, the assembly of the OIS stabilizer 420 is accomplished.

The AF actuator 430 may be coupled onto a side surface of the OIS stabilizer 420. A coupling unit 429 provided on a side surface of the moving unit 424 of the OIS stabilizer 420 may be coupled with the AF actuator 430.

The AF actuator 430 may mount the lens unit 410 (as shown in FIGS. 16 and 17) inside the lens carrier 431, and the lens carrier 431 may be coupled with the lens housing 432. A first direction moving unit 433 including the coil 433e and AF-side magnet 433a may be provided on a side surface of the lens housing 432. A second board (e.g., flexible circuit board) 434 may be provided which is electrically connected with the coil of the first direction moving unit 433 while supplying power the coil.

While the lens carrier 431 and the lens housing 432 are coupled together, the first guide member 433b provided on the side surface of the lens housing 432 is rendered to face the second guide member 433c provided on the side surface of the lens carrier 431, and multiple ball bearings 428 may be provided between the first and second guide member 433b and 433c to move the lens carrier 431 in the first direction (Z axis).

Figure 13:
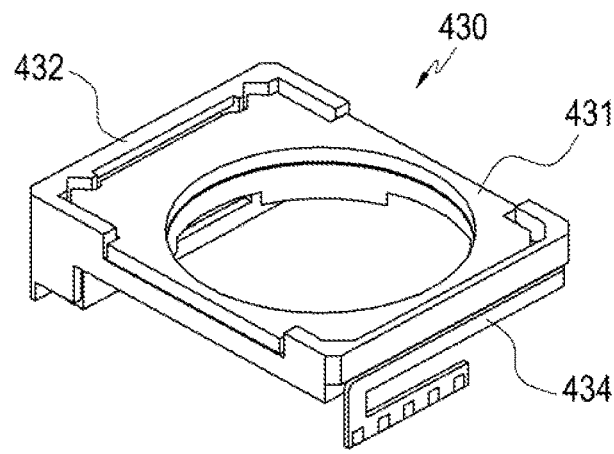
FIG. 13 is a perspective view illustrating a state in which an OIS stabilizer among components of a camera module is coupled according to an embodiment of the present disclosure.
Figure 15:
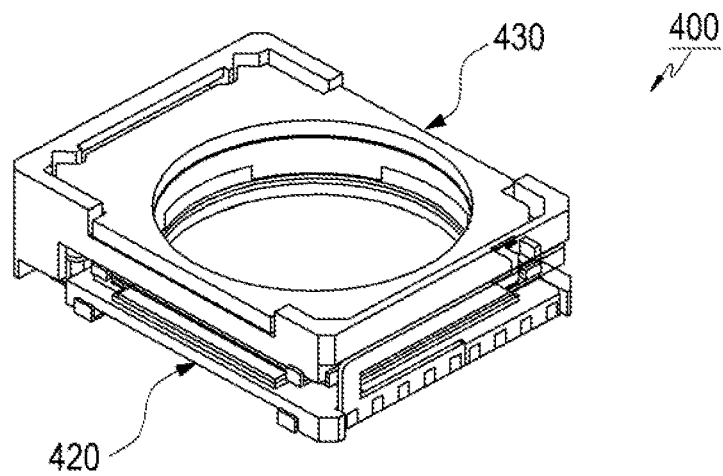
FIG. 15 is a perspective view illustrating a state in which an OIS stabilizer and AF actuator among components of a camera module are coupled according to an embodiment of the present disclosure.

FIG. 13 is a perspective view illustrating a state in which an AF actuator 430 can be coupled to an OIS stabilizer 420 (shown in FIG. 14) according to an embodiment of the present disclosure. FIG. 14 is a perspective view illustrating a state before an OIS stabilizer 420 and AF actuator 430 among components of a camera module are coupled according to an embodiment of the present disclosure. FIG. 15 is a perspective view illustrating a state in which an OIS stabilizer 420 and AF actuator 430 among components of a camera module are coupled according to an embodiment of the present disclosure.

Referring to FIG. 13, the AF actuator 430 may have the lens carrier 431 and include a second flexible circuit board 434 supplying power to the coil provided on the side surface of the lens housing 432. Referring to FIG. 14, the AF actuator 430 and the OIS stabilizer 420 may be coupled together. Referring to FIG. 15, the OIS stabilizer 420 may be provided at a lower side of the lens unit 410, and the AF actuator 430 may be disposed in parallel on a side surface of the OIS stabilizer 420.

An operation of the camera module 400 is now described with reference to FIGS. 16 and 17 according to an embodiment of the present disclosure.

FIG. 16 is a perspective view illustrating a coupled state of a camera module according to an embodiment of the present disclosure. FIG. 17 is a side cross-sectional view illustrating a coupled state of a camera module according to an embodiment of the present disclosure.

Referring back to FIG. 4, the 'Z axis' means a vertical direction of the camera module which is the first direction along which the lens carrier 431 is moved, the 'X axis' means the first sub direction along which the lens carrier 431 is moved in a horizontal direction (upper and lower direction of the first direction), and the 'Y axis' means a vertical direction (direction perpendicular to the first direction or left and right direction of X axis) which is the second sub direction along which the lens carrier 431 is moved. The AF actuator described below may provide an actuating force for moving the lens carrier 431 along the first direction (Z axis) for autofocusing, and the OIS stabilizer may provide an actuating force for actuating the lens carrier 431 in the first and second direction (X and Y axes) to compensate for horizontal balance.

First, the yolk 423 of the OIS stabilizer 420 may be disposed to face a plurality of magnets 421a provided in the base 421 while positioning the lens unit 410 (as shown in FIGS. 16 and 17) at the center portion of the first direction (Z axis) by the magnetic force of the magnet 421a. In this state, when power is applied to the first and second sub actuator 425 and 426 through the first board (e.g., flexible circuit board) 427, the first and second sub actuator 425 and 426 may be changed in length to move the moving unit 424 in the first and second direction (X and Y axes).

According to an embodiment of the present disclosure, as first ends of the first and second sub actuator 425 and 426 are coupled to the fastening unit 422, and second ends of the first and second sub actuator 425 and 426 are coupled to the moving unit 424, when power is applied to the first and second sub actuator 425 and 426, the moving unit 424 may be moved in the first and second sub direction (X and Y axes) by the first and second sub actuator 425 and 426. Since the base 421 has multiple balls 428 for moving the moving unit 424, the moving unit 424 may be moved by the balls 428. The moving unit 424 may provide an actuating force for anti-shake while moving the lens unit 410 (as shown in FIGS. 16 and 17) in the first and second direction (X and Y axes) by the first and second sub actuator 425 and 426.

Here, since the base 421 has an anti-shake-side location sensor (not shown) for recognizing and detecting the actuation location of the moving unit 424, the actuation location of the moving unit 424 may be detected by the anti-shake-side location sensor (not shown). Further, when the moving unit 424 is actuated by the first and second sub actuator 425 and 426, the yolk 423 may get the moving unit 424 back to its original location by the magnetic force of the magnet 421a. That is, the moving unit 424 may be positioned at the center portion of the first direction (Z axis) by the magnetic force of the magnet 421a and yolk 423.

Here, upon actuating the lens unit 410 (as shown in FIGS. 16 and 17) in the first direction (Z axis), power may be supplied to the coil 433e provided in the second board (e.g., flexible circuit board) 434 of the AF actuator. When power is applied to the coil 433e, the lens carrier 431 may be actuated in the first direction (Z axis) by the magnetic force generated between the coil 433e and the AF-side magnet 433a. Here, the focal length between the lens unit 410 and the image sensor (not shown) may be automatically adjusted. Since the first guide member 433b provided on a side surface of the lens housing 432 faces the second guide member 433c provided on a side surface of the lens carrier 431, and multiple ball bearings 433d are provided between the first and second guide member 433b and 433c, the second guide member 433c of the lens carrier 431 may be moved by the ball bearings 433d. The lens carrier 431 may be moved in the first direction (Z axis) by the first and second guide member 433b and 433c and ball bearings 433d.

An AF-side location sensor 460 provided at a location neighboring the coil 433e may detect the movement location of the first direction (Z axis) of the lens carrier 431.

That is, the AF-side location sensor 460 capable of feedback measurement on the Gaussian value of the AF-side magnet 433a and the coil 433e may be configured on the second flexible circuit board 434 to actuate the AF actuator 430 including the lens unit 410 (as shown in FIGS. 16 and 17), thereby allowing for accurate detection of AF actuation of the camera module by the AF-side location sensor 460.

In one embodiment, in the AF actuator 430, the coil 433e and the AF-side magnet 433a may actuate in the first direction (Z axis) with a Lorenz magnetic force The AF-side location sensor 460 may detect actuation in the first direction (Z axis) of the magnet 433a. As such, in order to reduce the size and height of the product in the OIS stabilizer 420, the elastic member according to the related art is removed, and the moving unit 424 and the fastening unit are coupled together using the magnet 421a and the yolk 423 to slim down the product. Further, the balls 428 may be used to reduce frictional resistance in the second direction (X and Y axes) as well as support by friction. In one embodiment, application of power to the moving unit 424, which is a function of the elastic member according to the related art, may be implemented through the first flexible circuit board 427, and in order to reduce the height in the first direction (Z axis), the offset-applied and AF actuator, which are arranged in series according to the related art, are arranged in parallel, thus leading to the product being more compact and slimmer.

According to an embodiment of the present disclosure, as described above in connection with FIG. 4, the camera module 400 included in the electronic device may include the lens unit 410 (as shown in FIGS. 16 and 17), at least one AF actuator 430 for moving the lens unit in the first direction (Z axis), and at least one OIS stabilizer 420 for moving the lens unit in the second direction (X and Y axes), and the OIS stabilizer may be connected with the AF actuator not to be stacked over the AF actuator in the first direction.

Further, according to an embodiment of the present disclosure, the at least one OIS stabilizer may include the coupling unit 429 coupling with the at least one AF actuator on a surface thereof, and as the at least one AF actuator moves in the first direction (Z axis), the at least one AF actuator may be configured to move in the first direction (Z axis) as well.

Further, according to an embodiment of the present disclosure, the at least one OIS stabilizer may include a base 421, a moving unit 424 for moving in a second direction (X and Y axes), and at least one actuator connected with the base and the moving unit and configured to move the moving unit in the second direction (X and Y axes).

Further, according to an embodiment of the present disclosure, the at least one actuator may include a firs sub actuator 425 and a second sub actuator 426, the second direction (X and Y axes) may include a first sub direction (X axis) and a second sub direction (Y axis), and the first sub actuator may be configured to move the moving unit in the first sub direction (X axis), and the second sub actuator may be configured to move the moving unit in the second sub direction (Y axis).

Further, according to an embodiment of the present disclosure, the at least one OIS stabilizer 420 may include a yolk 423 connected with the moving unit 424 and at least one magnet 421a connected with the base, and the camera module may be configured to use the yolk 423 and the at least one magnet 421a to move the moving unit in the second direction (X and Y axes).

Further, according to an embodiment of the present disclosure, the at least one OIS stabilizer 420 may further include at least one ball 428 provided to reduce a frictional force between the moving unit and the base.

Further, according to an embodiment of the present disclosure, the at least one actuator may include a shape memory alloy (SMA).

Further, according to an embodiment of the present disclosure, the at least one OIS stabilizer may include a board 427 supplying power the actuator.

Further, according to an embodiment of the present disclosure, the at least one OIS stabilizer 420 may include a location sensor (not shown) for detecting a movement location of the moving unit.

Further, according to an embodiment of the present disclosure, the at least one OIS stabilizer 420 may include a first OIS stabilizer and a second OIS stabilizer, and the second direction (X and Y axes) may include a first sub direction (X axis) and a second sub direction (Y axis), and the first OIS stabilizer may be configured to move the lens unit in the first sub direction (X axis), and the second OIS stabilizer may be configured to move the lens unit in the second sub direction (Y axis).

Further, according to an embodiment of the present disclosure, the at least one OIS stabilizer may be configured to receive a portion of power through the AF actuator.

Further, according to an embodiment of the present disclosure, the lens unit may be positioned at the center portion of the first direction by the magnetic force of the magnet and yolk.

Further, according to an embodiment of the present disclosure, the AF actuator 430 and the OIS stabilizer 420 may be arranged in parallel along a side surface of the lens unit 410.

Further, according to an embodiment of the present disclosure, the magnet may be disposed at a lower side of the moving unit 424, and the yolk may be disposed at an upper side of the fastening unit 422 while facing the magnet.

Further, according to an embodiment of the present disclosure, the AF actuator 430 may include a lens carrier 431 having the lens unit, a lens housing 432 coupled with the lens carrier, a first direction moving unit including an AF-side magnet and a coil provided on a side surface of the lens housing to move the lens carrier in the first direction (Z axis) when powered, and a board 434 electrically connected with the coil of the first direction moving unit 433 and supplying power to the coil.

Further, according to an embodiment of the present disclosure, the first direction moving unit 433 may include the AF-side magnet 433*a* provided on a side surface of the lens carrier, a first guide member 433*b* provided on a side surface of the lens housing and the coil 433*e* facing the AF-side magnet 433*a* to move the lens carrier in the first direction when powered, a second guide member 433*c* provided on a side surface of the lens carrier to face the first guide member and moving the lens carrier in the first direction, and multiple ball bearings 433*d* enabling the lens carrier to move.

Further, according to an embodiment of the present disclosure, the first guide member includes a first yolk 440 disposed to face the AF-side magnet 433*a* with the coil disposed therebetween, and the second guide member 433*c* includes a second yolk 450 disposed to face the coil with the AF-side magnet disposed therebetween.

Further, according to an embodiment of the present disclosure, the first direction moving unit 433 may include at least one location sensor 460 detecting a movement location of the first direction moving unit.

Further, according to an embodiment of the present disclosure, a camera module 400 of an electronic device 10 may comprise a lens unit 410 (as shown in FIGS. 16 and 17), an autofocus (AF) actuator 430 (as shown in FIGS. 16 and 17) connected with the lens unit in a first direction (Z axis), an optical image stabilization (OIS) actuator 420 (as shown in FIGS. 16 and 17) connected with the AF actuator in a second direction (X and Y axes), and a processor (not shown), and the processor may be configured to move the lens unit 410 in the first direction using the AF actuator 430 at least based on a location of an external object (not shown), move the lens unit 410 in the second direction using the OIS stabilizer 420 at least based on a movement of the electronic device 10, and obtain at least one image for the external object using the lens unit 410.

According to an embodiment of the present disclosure, location recognition between the external object and the electronic device 10 may include contrast-based recognition (e.g., contrast autofocus (CAF), phase difference-based recognition (phase autofocus (PAF), and depth sensor-based recognition. To recognize the location between the external object and the electronic device, other methods than the above-described recognition method may also be adopted.

The contrast-based recognition (CAF) is a scheme of adjusting the lens up to the position where the image captured by the OIS stabilizer shows the highest contrast using such a characteristic that an in-focus image is clearly outlined so that the contrast increases, while an out-focus image is outline-blurred causing the contrast to decrease.

The phase difference-based recognition (PAF) is a scheme of detecting an autofocus (AF) using the phase difference between two light beams having different paths and coming from an external object, which is created by a path difference that occurs between the two light beams when the two light beams meet.

The depth sensor-based recognition may trace three-dimensional (3D) depth information on a human movement using multiple cameras and infrared cameras. The recognition of a human action using a depth sensor may use a camera receiving the action in red, green, blue (RGB) image and a camera detecting depth after laser pointing, process two pieces of image information entered through digital filtering, and then generate human action recognition information as 3D skeleton data. The depth sensor radiates infrared beams to the user using a laser, measures the strength of reflections coming from connecting points, measures the distance through the strength of reflections, and estimate that points with a weak reflection strength come from far away while points with a higher reflection strength come from the user at the front. By doing so, this scheme may recognize the user's major joints and detect his body movement.

According to an embodiment of the present disclosure, an operation of the camera module 400 in the electronic device is described below in further detail.

Figure 32:
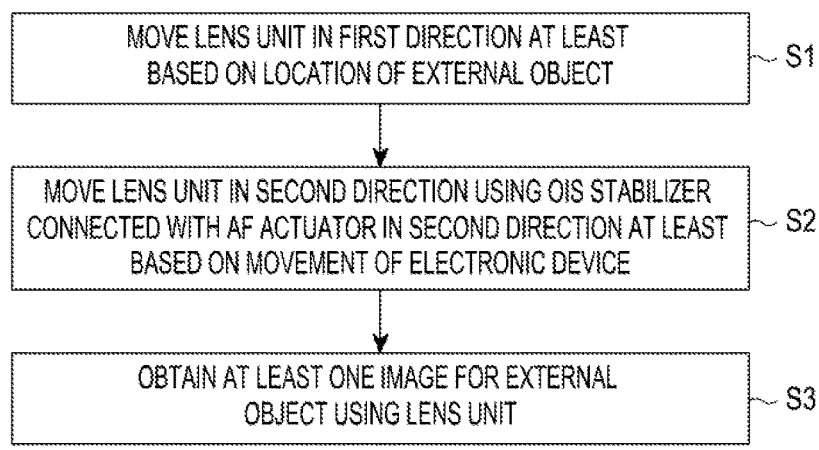
FIG. 32 is a flowchart illustrating an operation state of a camera module according to an embodiment of the present disclosure.

FIG. 32 is a flowchart illustrating an operation state of a camera module according to an embodiment of the present disclosure.

Referring to FIG. 32, the operation of the camera module is described. The camera module 400 (as shown in FIGS. 16 and 17) in the electronic device including the lens unit 410 (as shown in FIGS. 16 and 17), the AF actuator 430 (as shown in FIGS. 16 and 17) connected with the lens unit in the first direction (Z axis), and the OIS stabilizer 420 (as shown in FIGS. 16 and 17) connected with the AF actuator in the second direction (X and Y axes), may be operated to move the lens unit 410 in the first direction using the AF actuator 430 at least based on the location between an external object and the electronic device at operation S1 and move the lens unit in the second direction using the OIS stabilizer 420 at least based on the movement of the electronic device at operation S2.

Next, it may obtain at least one image on the external object using the lens unit at operation S3.

Further, the electronic device may include a processor (not shown). The processor may actuate the lens unit to move in the first and second direction using the AF actuator and the OIS stabilizer at least based on the movement of the electronic device 10.

A method for recognizing the location between the external object and the electronic device 10 (e.g., the electronic device 101 in FIG. 3) may include contrast-based recognition (e.g., contrast autofocus (CAF), phase difference-based recognition (phase autofocus (PAF), and depth sensor-based recognition. To recognize the location between the external object and the electronic device, other methods than the above-described recognition method may also be adopted.

According to another embodiment of the present disclosure, a configuration of the camera module 200 in the electronic device 10 is described below in more detail.

Figure 18:
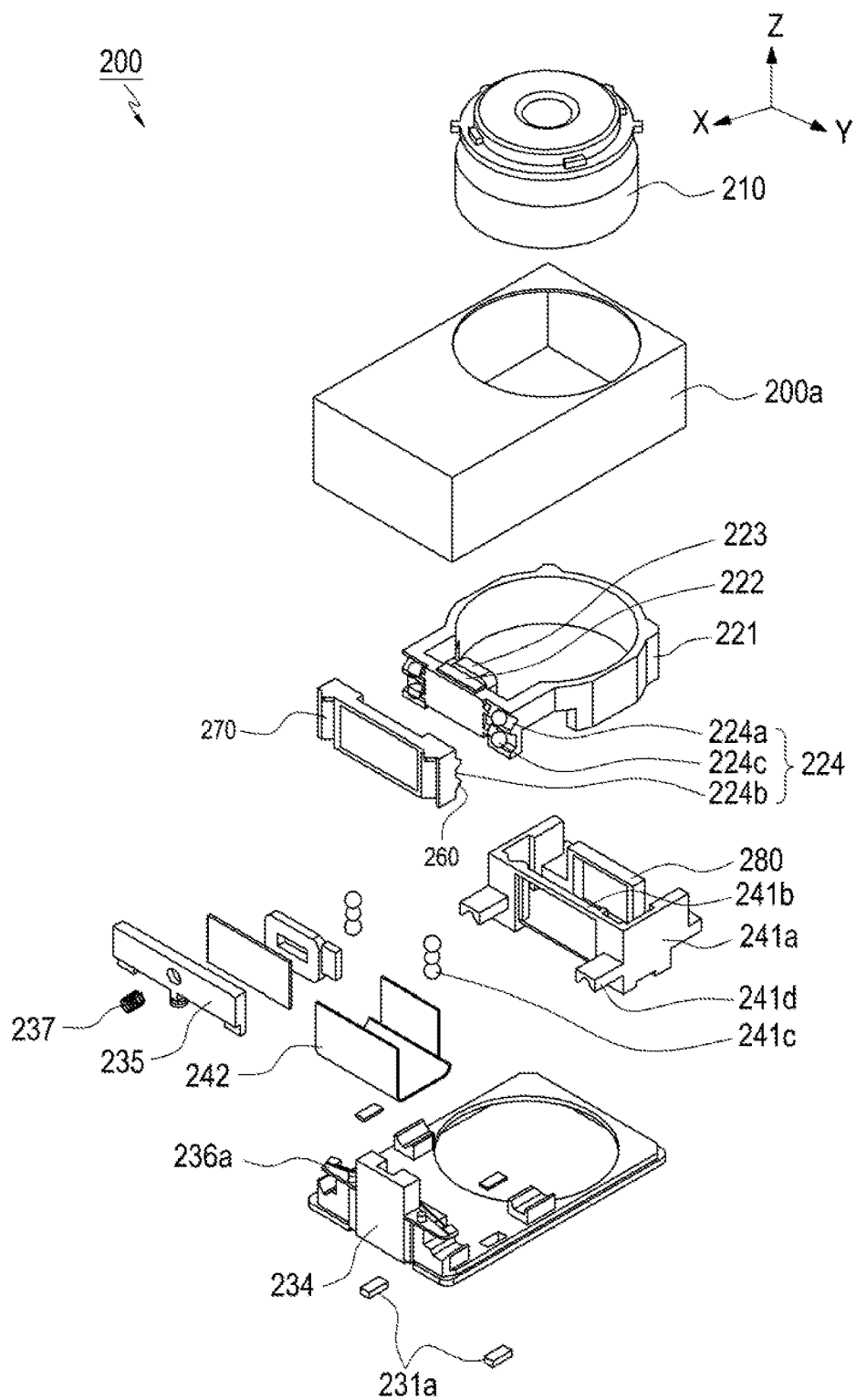
FIG. 18 is an exploded perspective view illustrating a configuration of a camera module according to an embodiment of the present disclosure.

FIG. 18 is an exploded perspective view illustrating a configuration of a camera module 200 according to another embodiment of the present disclosure.

Figure 22:
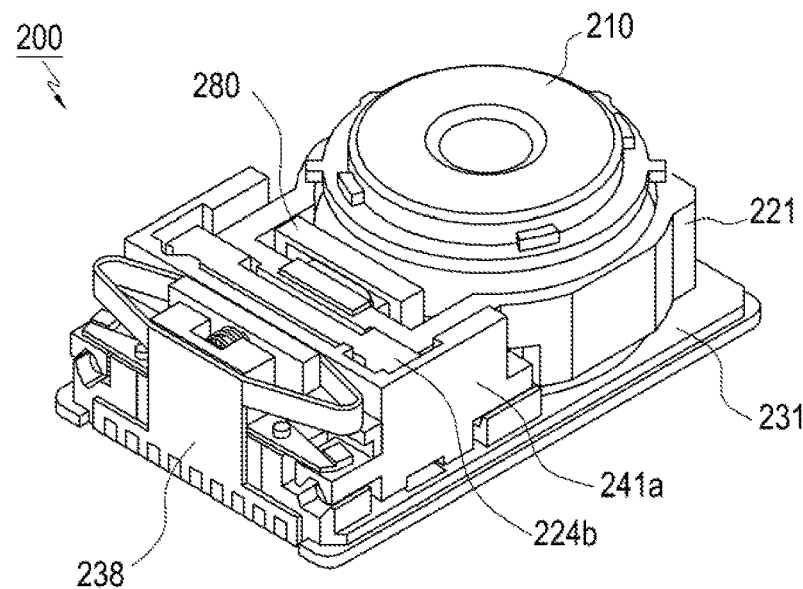
FIG. 22 is a perspective view illustrating a coupled state of a camera module according to an embodiment of the present disclosure.

Referring to FIG. 18, the camera module 200 is described. The camera module 200 may include a lens unit 210, a first and second OIS stabilizer 220 and 230, and an AF actuator 240 (as shown in FIG. 22, for example). The first and second OIS stabilizer 220 and 230 and the AF actuator 240 may be asymmetrically arranged with respect to the optical axis (Z axis). According to an embodiment of the present disclosure, the lens unit 210 may be actuated by the first and second OIS stabilizer 220 and 230 and the AF actuator 240, which are described below, along the optical axis (e.g., Z axis) and first and second direction (e.g., X and Y axes), and the first and second OIS stabilizer 220 and 230 may be provided on a side surface of the lens unit 210 to actuate the lens unit 210 in the first and second direction (X and Y axes) on a plane perpendicular to the optical axis (Z axis) to compensate for a shake of the lens unit 210, and the AF actuator 240 may be provided between the first and second OIS stabilizer 220 and 230 to actuate the lens unit 210 along the optical axis (Z axis). As such, the first and second OIS stabilizer 220 and 230 and the AF actuator 240, which are arranged in series according to the related art, are arranged in parallel along the side surface of the lens unit 210, thus leading to the product to be more slim and compact.

The Z axis direction is provided as an example of the optical axis direction, but the optical axis direction may be a direction other than the Z axis direction. Likewise, the first and second direction may be a direction other than the X or Y axis direction.

According to an embodiment of the present disclosure, hereinafter, the optical axis direction may be regarded as Z axis direction, and the first and second direction as the X and Y direction.

Figure 19:
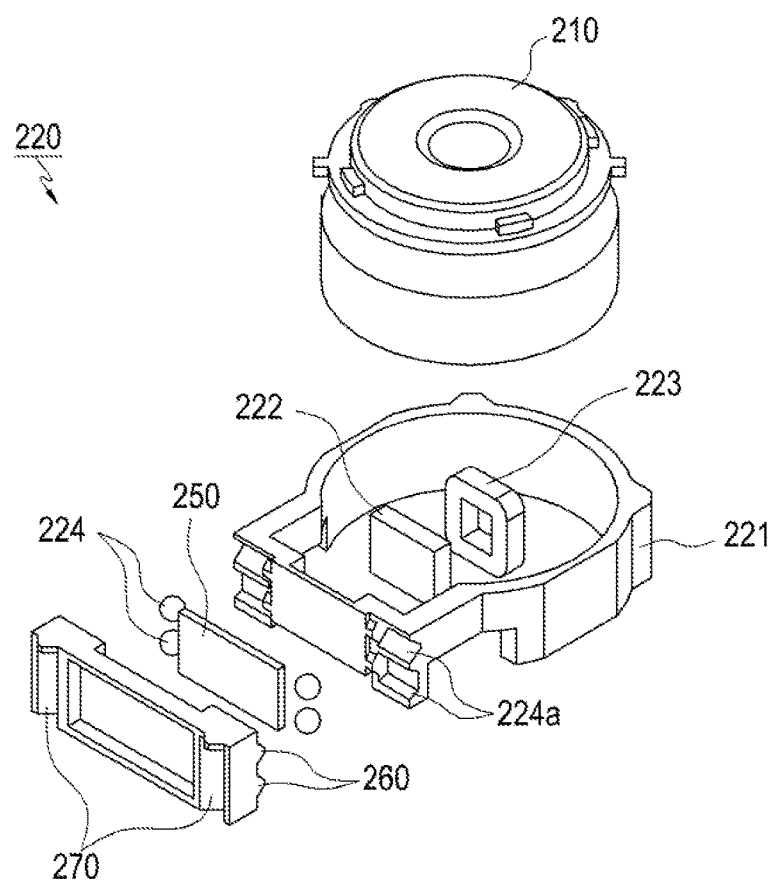
FIG. 19 is an exploded perspective view illustrating a second direction (Y axis) actuator among components of an OIS stabilizer among components of a camera module according to an embodiment of the present disclosure.

FIG. 19 is an exploded perspective view illustrating a configuration of OIS stabilizers 220 and 230 among components of a camera module according to an embodiment of the present disclosure.

Referring to FIG. 19, the first OIS stabilizer 220 may include, e.g., a lens carrier 221 coupled with a lens unit 210, a first magnet 222, a first coil 223, and a first moving unit 224. The first magnet 222 may be provided on a side surface of the lens carrier 221 to face the first coil 223 and generate a magnetic field when power is applied to the coil 223 to actuate the lens carrier 221 in the second direction (Y axis). The first coil 223 may be provided inside the lens carrier 221 to face the first magnet 222, and when powered, actuate the lens carrier 221 in the second direction (Y axis). The first moving unit 224 may be provided on a side surface of the lens carrier 221 to move the lens carrier 221 along the optical axis (Z axis). The first moving unit 224 may include, e.g., a pair of guide holes 224a, a guide member 224b, and a ball bearing 224c. The pair of guide holes 224a may be provided on a side surface of the lens carrier 221 to face the guide member 224b and move as described below. The guide member 224b may face the pair of guide holes 224 and move. The ball bearing 224c may be provided between the guide member 224b and the pair of guide holes 224a to enable the lens carrier 221 to move.

Further, the guide member 224b may include a first yolk 250 and a second yolk 241f described below, and the first yolk 250 may be positioned to face the first magnet 222.

For example, in order to enable the lens carrier 221 to move, on an end surface of the guide member 224 may be provided a first guide member 260 facing the pair of guide holes 224a, having the first yolk 250, and guiding the lens carrier 221 to be moved in the second direction (Y axis), and on another end surface of the guide member 224b may be provided a second guide member 270 having the second yolk 241f and guiding the lens carrier 221 to be moved in the optical axis (Z axis) direction.

Figure 20:
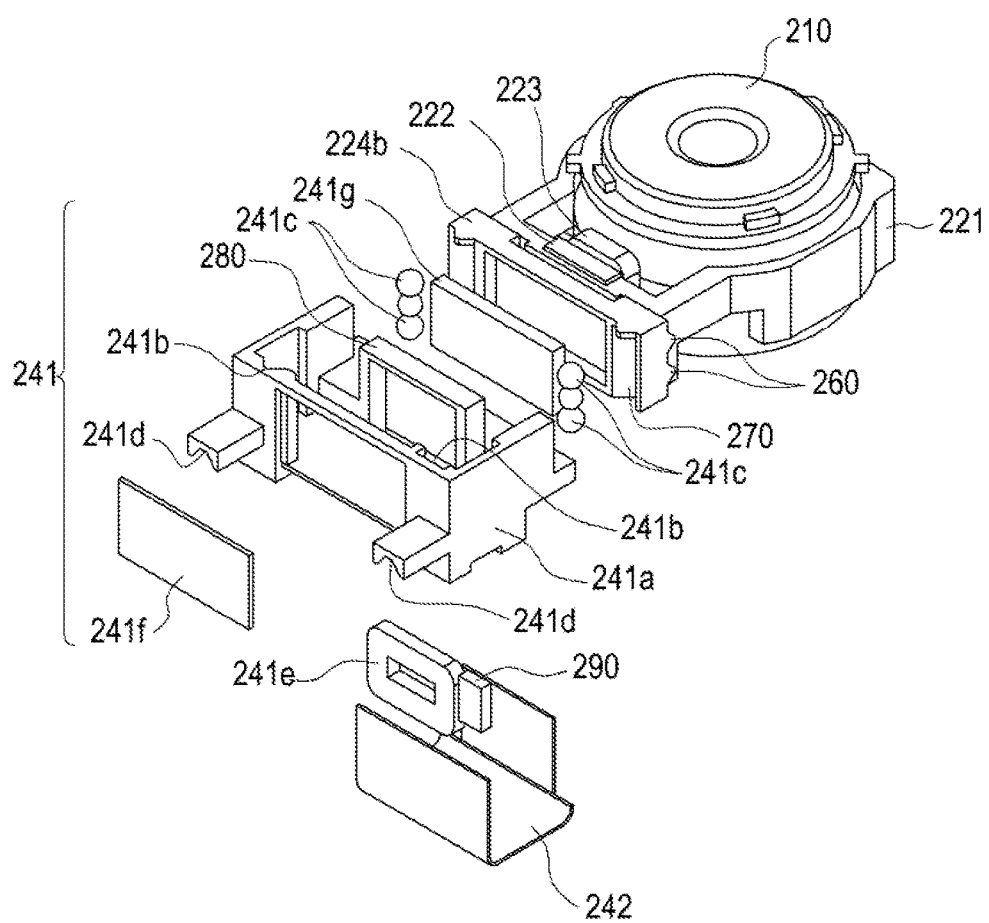
FIG. 20 is an exploded perspective view illustrating a configuration of an AF actuator among components of a camera module according to an embodiment of the present disclosure.

The configuration of the AF actuator 240 is described in further detail. FIG. 20 is an exploded perspective view illustrating a configuration of an AF actuator 240 among components of a camera module according to an embodiment of the present disclosure.

Referring to FIG. 20, the AF actuator 240 may include an optical axis moving unit 241 and a flexible circuit board 242. The optical axis moving unit 241 may be provided on a side surface of the first OIS stabilizer 220 to face the second guide member 270 and move the lens carrier 221 in the optical axis (Z axis) direction when powered. The flexible circuit board 242 may be provided on a side surface of the second guide member 270 to supply power to the second coil 241e described below while electrically connected with the second coil 241e of the optical axis moving unit 241. As described above in connection with FIG. 20, the optical axis moving unit 241 may include, e.g., the moving body 241a, first and second ball guide members 241b and 241d, and multiple ball bearings 241c. The moving body 241a may be provided on a side surface of the second guide member 270 to have the first and second ball guide member 241b and 241d and ball bearing 241c as described below. The first ball guide member 241b may face the second guide member 270, have the second coil 241e provided to face the second magnet 241g, and may be formed inside the moving body 241a to move the lens carrier 221 in the optical axis (Z axis) direction when power is applied to the second coil 241e. The ball bearings 241c may be provided between the second guide member 270 and the first ball guide member 241b to move the lens carrier 221 in the optical axis (Z axis) direction. The second ball guide member 241d may be formed to extend from an outer surface of the moving body 241a to move the lens carrier 221 in the optical axis (Z axis) direction. The moving body 241a may include a coil supporting member 280 coupled with the first coil 223 of the first OIS stabilizer 220 while supporting the first coil 223.

For example, the coil supporting member 280 may be coupled with the first coil 223 to support to face the first magnet 222 of the first OIS stabilizer 220.

The first ball guide member 241b may include the second yolk 241f positioned to face the second magnet 241g with the second coil 241e disposed therebetween.

According to an embodiment of the present disclosure, the optical axis moving unit 241 may actuate the lens carrier 221 in the optical axis (Z axis) direction by the first and second ball guide member 241b and 241d by the magnetic force generated between the second magnet 241g and the second coil 241e when power is applied to the second coil 241e.

The optical axis moving unit 241 may include a location sensor 290 for detecting a movement location of the optical axis moving unit 241.

According to an embodiment of the present disclosure, an actuating circuit unit (not shown) in the electronic device may apply an actuation signal for focusing to the second coil 241e based on focusing state information provided through a separate route and location information on the optical axis moving unit 241 detected by the location sensor 290.

Figure 21:
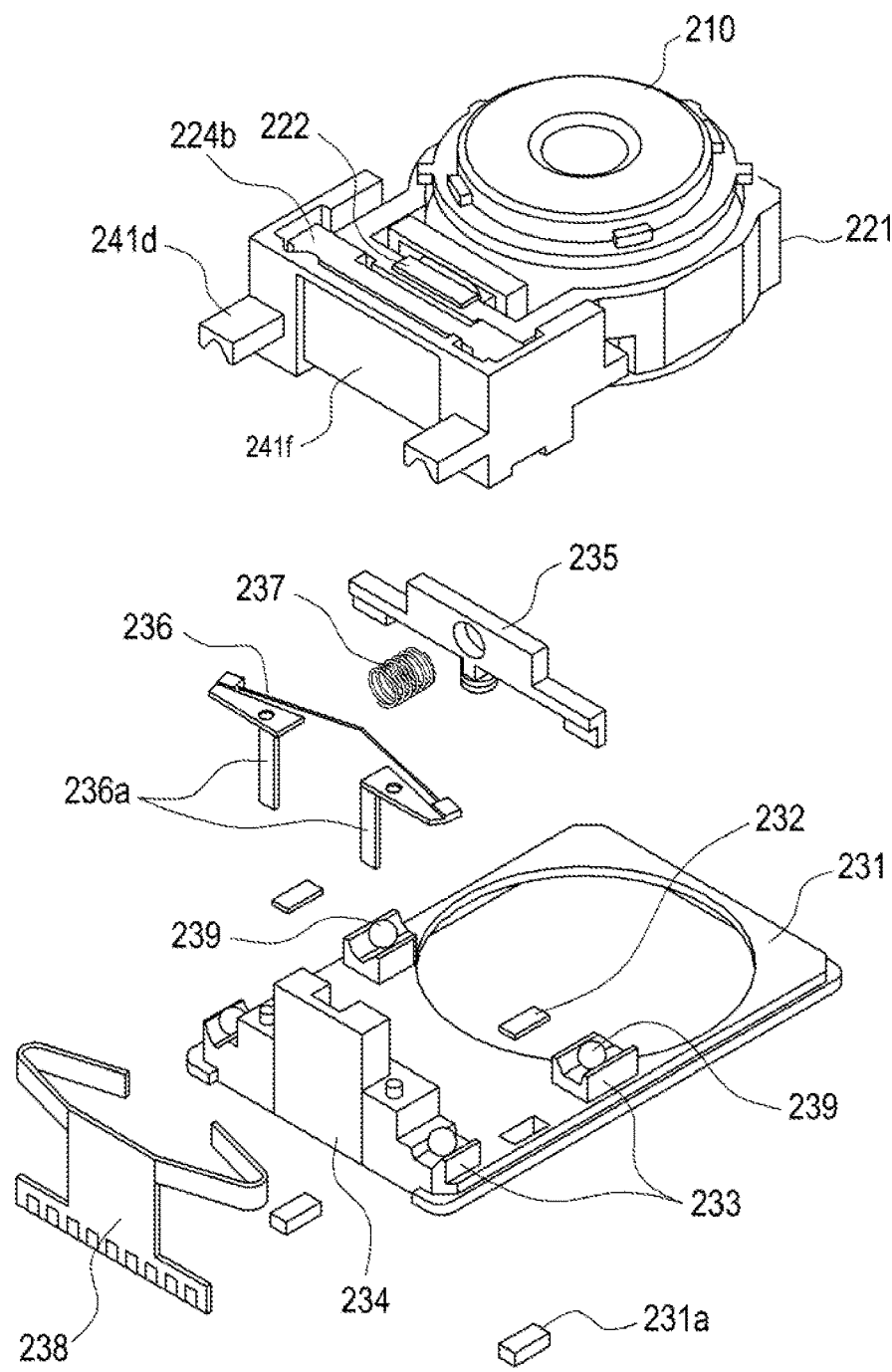
FIG. 21 is an exploded perspective view illustrating a first direction (X axis) actuator among components of an OIS stabilizer among components of a camera module according to an embodiment of the present disclosure.

The configuration of the second OIS stabilizer 230 is described in greater detail. FIG. 21 is an exploded perspective view illustrating a configuration of the second OIS stabilizer 230 among components of a camera module according to an embodiment of the present disclosure.

Referring to FIG. 21, the second OIS stabilizer 230 may include a base 231, a third yolk 232, a plurality of first moving units 233, a fastening unit 234, a second moving unit 235, a first and second actuators 236 and 237, and a flexible circuit board 238. The fastening unit 234 described below may be provided on the top surface of the base 231 in a single body, and the third yolk 232, the moving unit, the first and second actuator 236 and 237, and flexible circuit board may be provided.

In one embodiment, a plurality of third magnets 231a may be provided on the top surface of the base 231 to face the third yolk 232, and the flexible circuit board may be mounted thereon. The fastening unit 234 may be fastened to the top surface of the base 231 to support so that the first and second actuator 236 and 237 may be actuated along the optical axis (Z axis). The third yolk 232 may be provided on the top of the base 231 to face the third magnets 231a and position and hold the lens unit 210 at the center portion of the optical axis (Z axis) direction by the magnetic force of the third magnets 231a.

The first moving units 233 may be provided on the top surface of the base 231 to face the second ball guide member 241d and move the lens carrier 221 along the optical axis (Z axis). The second moving unit 235 may face the fastening unit 234 to move the lens carrier 221, the first OIS stabilizer 220 and the AF actuator 240 along the optical axis (Z axis).

The first actuator 236 may be provided between the fastening unit 234 and the second moving unit 235 to control length when powered to move the second moving unit 235 along the optical axis (Z axis). The second actuator 237 may be provided between the fastening unit 234 and the second moving unit 235 to control length when powered to provide an elastic force so that the second moving unit 235 may move along the optical axis (Z axis).

The flexible circuit board 238 may be provided on the base 231 to supply power while electrically connected with the first actuator 236. That is, an end of the first actuator 236 may be coupled with the fastening unit 234, and a side surface of the first actuator 236 may face the second moving unit 235 so that the second moving unit 235 may be moved by the first actuator 236 along the optical axis (Z axis).

The first actuator 236 may be formed of a shape memory alloy (SMA). In this embodiment, although the first and second actuator 236 and 237 is described as being formed of SMA, the present disclosure is not limited thereto. That is, the first and second actuator 236 and 237 may be formed of any other various materials that may control length when powered.

The SMA denotes an alloy that has different crystal arrangements at a higher temperature and lower temperature (e.g., room temperature), respectively, and although transformed at a lower temperature, may be back to the shape at the higher temperature by heating at a predetermined temperature or higher. According to an embodiment of the present disclosure, the first and second actuator 236 and 237, when powered and thus heated, is changed in length, allowing the moving unit to move in the first and second direction (X and Y axes).

The second actuator 237 is formed of a coil spring. That is, the moving unit is moved by the first actuator 236 along the optical axis (Z axis) and then returns to its original position by an elastic force of the coil spring. Accordingly, the moving unit may be moved to the left or right along the optical axis (Z axis) by the first and second actuator 236 and 237.

A plurality of balls 239 may be provided between the second ball guide member 241d and 224b and the moving unit 233 to move the lens carrier 221.

The first actuator 236 may have a pair of supporting members 236a coupled and fastened to the fastening unit 234 and coupled and supporting the first actuator 236.

For example, the pair of supporting members 236a may be coupled to both ends of the first actuator 236, and in this state, they are coupled to the fastening unit 234. Here, the center portion of the first actuator 236 faces the second moving unit 235. Accordingly, when power is supplied to the first actuator 236, the length of the first actuator 236 is changed, allowing the second moving unit 235 to be actuated along the optical axis (Z axis).

Further, the base 231 may have at least one location sensor (not shown) to detect the shake movement location of the second moving unit 235.

The location sensor (not shown) may be, e.g., a hall sensor. An actuating circuit unit (not shown) provided in the electronic device may apply an actuation signal for anti-shake to each coil based on vibration information detected through, e.g., an angular velocity sensor in the electronic device, e.g., information on the amount and direction of vibration, and location information on the OIS stabilizer 220 and 230 detected from the location sensor. The actuation signal may include power or current.

Further, a printed circuit board (not shown) having an image sensor (not shown) may be provided at a lower side of the base 231.

Assembly of the camera module 200 is now described according to an embodiment of the present disclosure.

Figure 23:
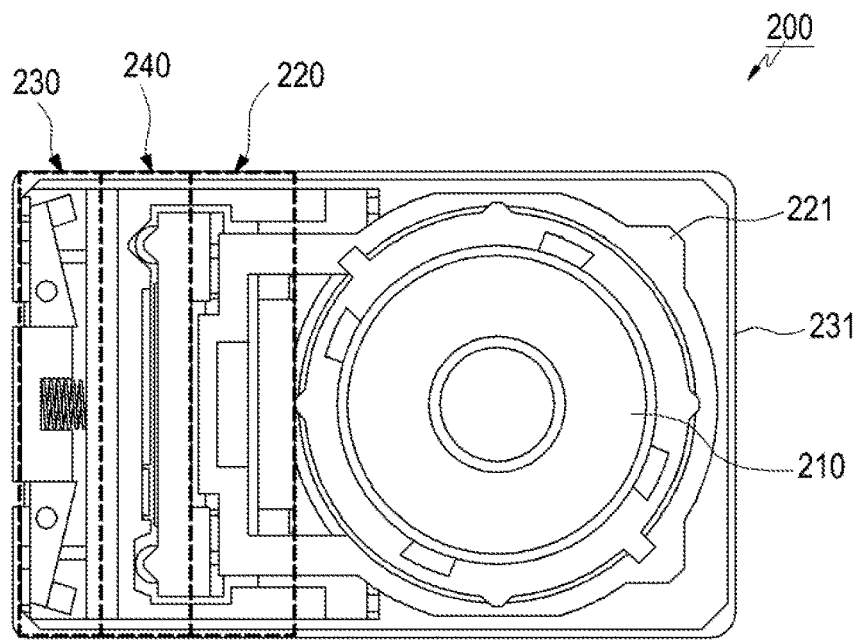
FIG. 23 is a plan view illustrating a coupled state of a camera module according to an embodiment of the present disclosure.

FIG. 22 is a perspective view illustrating a coupled state of a camera module according to an embodiment of the present disclosure. FIG. 23 is a plan view illustrating a coupled state of a camera module according to an embodiment of the present disclosure.

As described above in connection with FIG. 18, the lens unit 210 may be coupled to the lens carrier 221, and the first OIS stabilizer 220 may be provided on a side surface of the lens carrier 221 to actuate the lens unit 210 in the second direction (Y axis). The AF actuator 240 may be provided on a side surface of the first OIS stabilizer 220 to actuate the lens unit 210 in the optical axis (Z axis) direction. In this state, the second OIS stabilizer 230 may be provided at a lower side of the AF actuator 240 to actuate the lens unit 210 along the optical axis (Z axis). The third yolk 232 of the second OIS stabilizer 230 may face the plurality of third magnets 231a on the top surface of the base 231 and position the lens unit 210 at the center portion of the optical axis (Z axis) direction by the magnetic force of the magnets while maintaining the initial location. In this state, a housing 200a may be coupled to the base 231 to protect the first and second OIS stabilizer 220 and 230 and the AF actuator 240.

Referring to FIGS. 22 and 23, the first and second OIS stabilizer 220 and 230 and the AF actuator 240 may be arranged in parallel along a side surface of the lens unit 210.

The operation of a camera module is now described with reference to FIG. 23 according to an embodiment of the present disclosure.

In FIG. 18 described above, the 'Z axis' denotes an optical axis which is a vertical direction of the camera module along which the lens carrier 221 is moved, 'X axis' denotes the horizontal direction of the camera module (upper and lower direction of the optical axis (Z axis)), and the Y axis denotes a vertical direction of the camera module (left and right direction of X axis and direction perpendicular to the optical axis (Z axis)). The AF actuator described below may provide an actuating force for moving the lens carrier 221 along the optical axis (Z axis) for autofocusing, and the OIS stabilizer may provide an actuating force for actuating the lens carrier 221 in the first and second direction (X and Y axes) to compensate for horizontal balance.

First, the third yolk 232 of the OIS stabilizer 230 may be disposed to face a plurality of third magnets 231a provided in the base 231 while positioning the lens unit 210 at the center portion of the optical axis (Z axis) by the magnetic force of the third magnet 231a. In this state, when power is supplied to the first actuator 236 through the flexible circuit board, the length of the center portion of the first actuator 236 is changed, allowing the second moving unit 235 to move along the optical axis (Z axis).

According to an embodiment of the present disclosure, since an end of the first and second actuator 236 and 237 is coupled with the fastening unit 234, and the center portion of the first actuator 236 faces the moving unit, when power is supplied to the first actuator 236, the second moving unit 235 may be moved by the first actuator 236 along the optical axis (Z axis). At this time, since the base 231 has multiple balls 239 for moving the second moving unit 235, the second moving unit 235 may be moved by the balls 239. The moving unit 235 may provide an actuating force for anti-shake while moving the lens unit 210 by the first actuator 236 along the optical axis (Z axis).

Here, since the base 231 has an anti-shake-side location sensor (not shown) for recognizing and detecting the actuation location of the moving unit 235, the actuation location of the moving unit 424 may be detected by the anti-shake-side location sensor (not shown). Further, upon actuating the second moving unit 235 by the first actuator 236, the second moving unit 235 may be back to its original location by elastic force of the second actuator 237. Here, the second moving unit 235 may be easily put on hold at the center portion of the optical axis by magnetic force of the third yolk 232 and the third magnet 231a.

Here, upon actuating the lens unit 210 along the optical axis, power may be fed to the second coil 241e provided on the flexible circuit board of the AF actuator. When power is fed to the second coil 241e, the lens carrier 221 may be actuated along the optical axis (Z axis) direction by electromagnetic force generated between the second coil 241e and the second magnet 241g. Here, the focal length between the lens unit 210 and the image sensor (not shown) may be automatically adjusted. The first ball guide member 241b formed inside the moving body 241a may face the second guide member 270 formed on the second end surface of the guide member 224b. Since multiple ball bearings 241c are provided between the second guide member 270 and the first ball guide member 241b, the second guide member 270 of the guide member 224b may be moved by the ball bearings 241c. The lens carrier 221 may be moved along the optical axis (Z axis) direction by the second guide member 270 and the ball bearings 241c.

The location sensor 290 provided at a location neighboring the second coil 241e may detect a movement location of the optical axis of the lens carrier 221.

Here, when the lens carrier 221 is actuated in the second direction (Y axis) by the first OIS stabilizer 220, if power is applied to the first coil 223, the lens carrier 221 may be actuated in the second direction (Y axis) by electromagnetic force generated between the first coil 223 and the first magnet 222. At this time, the first moving unit 224 provided on a side surface of the lens carrier 221 may move the lens carrier 221 in the second direction (Y axis).

Since the ball bearings 224c are provided between the first guide member 260 of the guide member 224b and the pair of guide holes 224a provided on a side surface of the lens carrier 221, the lens carrier 221 may be moved by the ball bearings 224c in the second direction (Y axis).

For example, the pair of guide holes 224a and the first guide member 260 may face each other, with the ball bearings 224c disposed therebetween.

A location sensor (not shown) provided at a position neighboring the first coil 223 may detect a movement location of the lens carrier 221 in the second direction (Y axis). As such, the first and second OIS stabilizer 220 and 230 and the AF actuator 240, which used to be arranged in series according to the related art, are arranged in parallel, allowing the product to be more compact and slimmer.

Further, according to an embodiment of the present disclosure, as described above in connection with FIG. 18, the camera module in the electronic device comprises a lens unit 210, an AF actuator 240 for actuating the lens unit along an optical axis (Z axis), and a first and second OIS stabilizer 220 and 230 for actuating the lens unit in a first and second direction (X and Y axes) on a plane perpendicular to the optical axis (Z axis) to compensate for a shake of the lens unit, and the first and second OIS stabilizer and the AF actuator may be disposed on side surfaces, respectively, of the lens unit.

Further, according to an embodiment of the present disclosure, the first and second OIS stabilizer 220 and 230 and the AF actuator 240 may be arranged in parallel in the direction of the side surface of the lens unit while the AF actuator is disposed between the first and second OIS stabilizer.

Further, according to an embodiment of the present disclosure, as shown in FIG. 19, the first OIS stabilizer 220 may include the lens carrier 221 coupled with the lens unit, the first magnet 222 provided on a side surface of the lens carrier, the first coil 223 provided to face the first magnet to actuate the lens carrier in the second direction (Y axis) when powered, and the first moving unit 224 provided on a side surface of the lens carrier to move the lens carrier in the second direction (Y axis).

Further, according to an embodiment of the present disclosure, the first moving unit 224 may include a pair of guide holes 224a provided on a side surface of the lens carrier, a guide member 224b having a second magnet and first yolk facing the pair of guide holes, and a ball bearing 224c enabling the lens carrier to move.

Further, according to an embodiment of the present disclosure, on an end surface of the guide member 224b may be provided a first guide member 260 facing the pair of guide holes 224a, having the first yolk 250, and guiding the lens carrier to be moved in the second direction (Y axis), and on another end surface of the guide member 224b may be provided a second guide member 270 having the second magnet and guiding the lens carrier to be moved in the optical axis (Z axis) direction.

Further, according to an embodiment of the present disclosure, as shown in FIG. 20, the AF actuator 240 may include an optical axis moving unit 241 provided on a side surface of the first OIS stabilizer 220, facing the second guide member 270, and moving the lens carrier in the optical axis (Z axis) direction when powered, and a flexible circuit board 238 electrically connected with the optical axis moving unit to supply power.

Further, according to an embodiment of the present disclosure, as shown in FIG. 20, the optical axis moving unit 241 may include a moving body 241a, a first ball guide member 241b having a second coil formed inside the moving body, facing the second guide member, and provided to face the second magnet and moving the lens carrier in the optical axis (Z axis) direction when powered, multiple ball bearings 241c enabling the lens carrier to move in the optical axis (Z axis) direction, and a plurality of second ball guide members 241d extending from an outer surface of the moving body to move the lens carrier in the first direction (X axis).

Further, according to an embodiment of the present disclosure, the moving body 241a may include a coil supporting member 280 coupled with the first coil of the first OIS stabilizer while supporting the first coil.

Further, according to an embodiment of the present disclosure, the first ball guide member 241b may include the second yolk 241f positioned to face the second magnet 241g with the second coil 241e disposed therebetween.

Further, according to an embodiment of the present disclosure, the optical axis moving unit 241 may include a location sensor 290 detecting a movement location of the optical axis moving unit.

Further, according to an embodiment of the present disclosure, as shown in FIG. 21, the second OIS stabilizer 230 may include a base 231 including a plurality of third magnets on an upper surface thereof, a third yolk 232 facing the third magnets and positioning and holding the lens carrier at a center portion of the optical axis direction by a magnetic force of the third magnets, a plurality of first moving units 233 provided on the upper surface of the base, facing the second ball guide member, and moving the lens carrier in the first direction (X axis) perpendicular to the optical axis, a fastening unit 234 provided on the upper surface of the base, and a second moving unit 235 facing the fastening unit and moving the lens carrier, the first OIS stabilizer, and the AF actuator in the first direction (X axis).

Further, according to an embodiment of the present disclosure, as shown in FIG. 18, the second OIS stabilizer 230 may include a first actuator 236 provided between the fastening unit 234 and the second moving unit and controlling a length when powered to move the second moving unit in the first direction (X axis), a second actuator 235 provided between the fastening unit and the second moving unit to provide an elastic force enabling the second moving unit to move in the first direction (X axis), a flexible circuit board provided on the base and electrically connected with the first actuator to supply power to the first actuator, and a plurality of balls 239 enabling the lens carrier to move.

Further, according to an embodiment of the present disclosure, the first actuator may further include a pair of supporting members 236a coupled and fastened to the fastening unit and coupled to the first actuator while supporting the first actuator.

Further, according to an embodiment of the present disclosure, a camera module 200 of an electronic device 10 may comprise a lens unit 210 (as shown in FIG. 18), an autofocus (AF) actuator 240 (as shown in FIG. 18) connected with the lens unit in an optical axis (Z axis) direction, a first and second OIS actuator 220 and 230 (as shown in FIG. 18) connected with the AF actuator in a first and second direction (X and Y axes), and a processor (not shown), and the processor may be configured to move the lens unit 410 in the optical axis (Z axis) direction using the AF actuator 240 at least based on a location of an external object (not shown), move the lens unit 410 in the first and second direction using the first and second OIS stabilizer at least based on a movement of the electronic device 10, and obtain at least one image for the external object using the lens unit 210.

According to an embodiment of the present disclosure, location recognition between the external object and the electronic device 10 may include contrast-based recognition (e.g., contrast autofocus (CAF), phase difference-based recognition (phase autofocus (PAF), and depth sensor-based recognition. To recognize the location between the external object and the electronic device, other methods than the above-described recognition method may also be adopted.

According to an embodiment of the present disclosure, an operation of the camera module 200 in the electronic device is described below in further detail.

Referring to FIG. 32 mentioned above, the camera module 200 (as shown in FIG. 18) in the electronic device including the lens unit 210 (as shown in FIG. 18), the AF actuator 240 (as shown in FIG. 18) connected with the lens unit in the optical axis (Z axis) direction, and the first and second OIS stabilizer 220 and 230 (as shown in FIG. 18) connected with the AF actuator in the first and second direction (X and Y axes), may be operated to move the lens unit 210 in the optical axis (Z axis) direction urine the AF actuator 240 at east based on the location between an external object (not shown) and the electronic device 10 at operation S1 and move the lens unit in the first and second direction using the first and second OIS stabilizer 220 and 230 at least based on the movement of the electronic device at operation S2.

Next, it may obtain at least one image on the external object using the lens unit 210 at operation S3.

Further, the electronic device 10 may include a processor (not shown). The processor may actuate the lens unit to move in the optical axis or first and second direction using the AF actuator 240 and the first and second OIS stabilizer 220 and 230 at least based on the movement of the electronic device 10.

According to another embodiment of the present disclosure, a configuration of a camera module 300 in the electronic device is described below in more detail.

Figure 24:
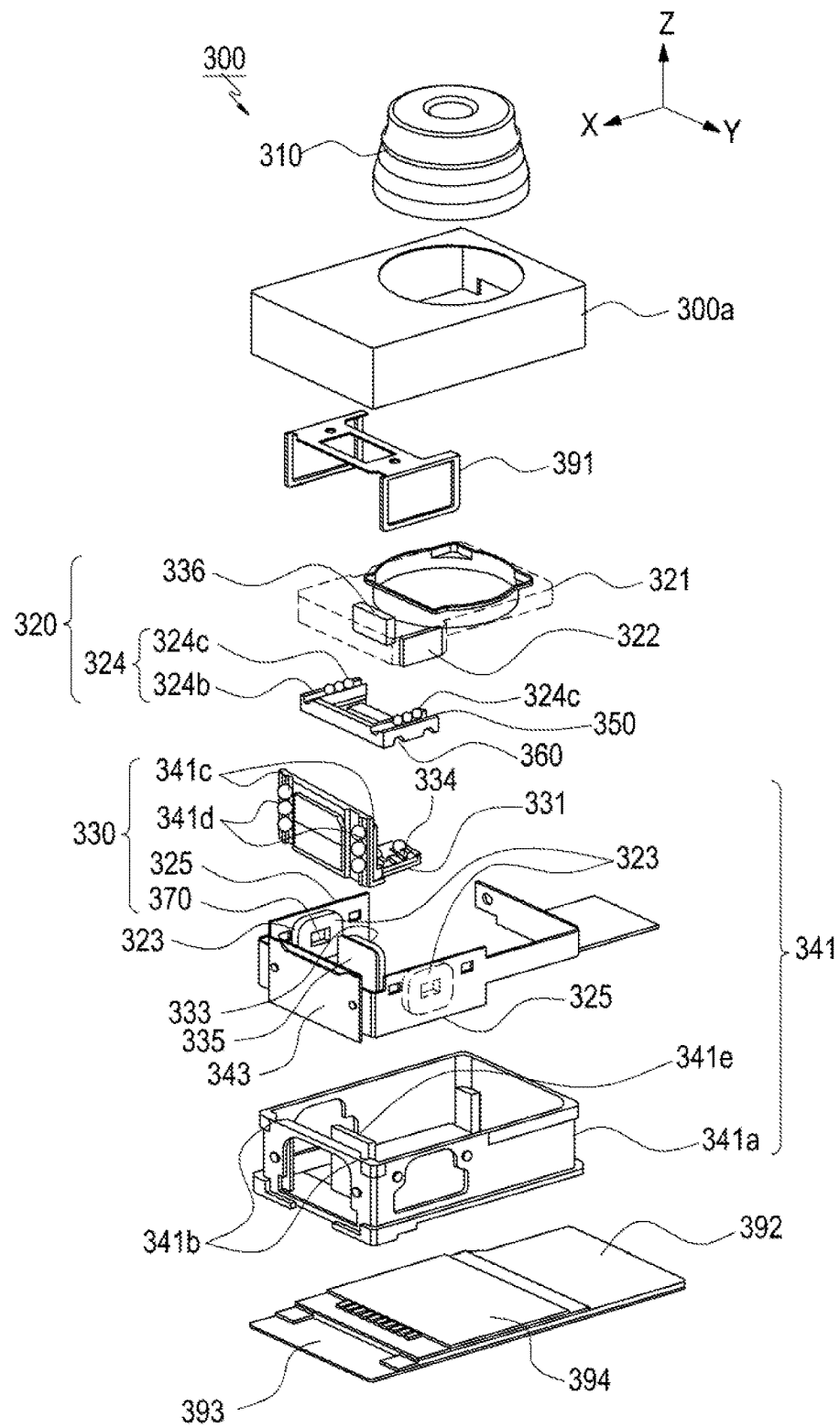
FIG. 24 is an exploded perspective view illustrating a configuration of a camera module according to an embodiment of the present disclosure.

FIG. 24 is an exploded perspective view illustrating a configuration of a camera module 300 according to another embodiment of the present disclosure.

Figure 31:
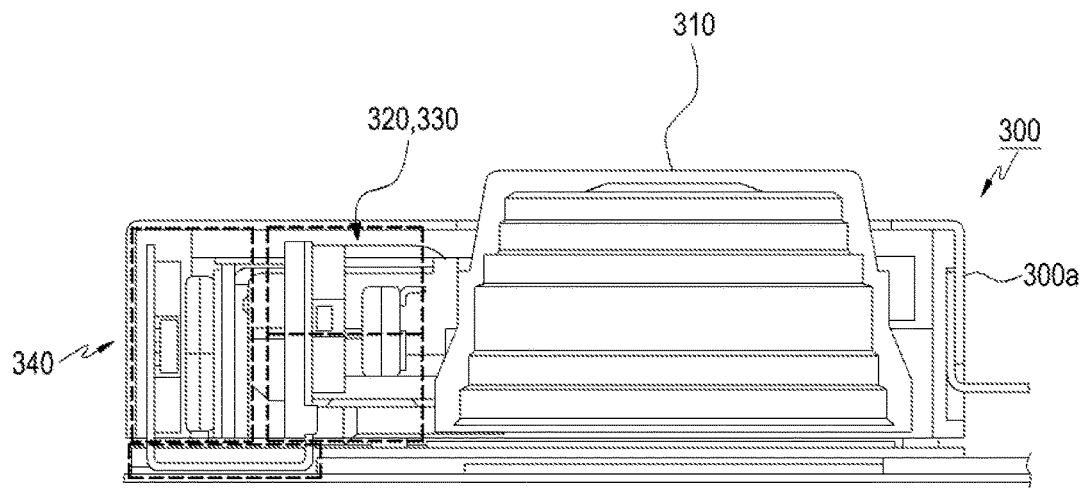
FIG. 31 is a side cross-sectional view illustrating a coupled state of a camera module according to an embodiment of the present disclosure.

Referring to FIG. 24, the camera module 300 is described. The camera module 300 may include a lens unit 310, a first and second OIS stabilizer 320 and 330, and an AF actuator 340 (as illustrated in FIG. 31, for example). The lens unit 310 may be actuated in a first and second direction (e.g., X and Y axes) and an optical axis (e.g., Z axis) direction by the first and second OIS stabilizer 320 and 330 and the AF actuator 340 as described below. The first OIS stabilizer 320 may be provided on a side surface of the lens unit 310 to actuate the lens unit 310 in the first direction (X axis) on a plane perpendicular to the optical axis (Z axis) to compensate for a shake of the lens unit 310, and the second OIS stabilizer 330 may be coupled at a lower side of the first OIS stabilizer and provided on a side surface of the lens unit 310 to actuate the lens unit 310 in the second direction (Y axis) on the plane perpendicular to the optical axis (Z axis). The AF actuator 340 may be provided on a side surface of the first and second OIS stabilizer 320 and 330 to actuate the lens unit 310 along the optical axis (Z axis). As such, as the first OIS stabilizer 320 is provided on a side surface of the lens unit 310, and the second OIS stabilizer 330 is provided at a lower side of the first OIS stabilizer 320, and the AF actuator 340 is provided on a side surface of the first and second OIS stabilizer 320 and 330, they, unlike in the related art where they used to be arranged in series, are arranged in parallel, leading to the product being more compact and slimmer.

The Z axis direction is provided as an example of the optical axis direction, but the optical axis direction may be a direction other than the Z axis direction. Likewise, the first and second direction may be a direction other than the X or Y axis direction.

According to an embodiment of the present disclosure, hereinafter, the optical axis direction may be regarded as Z axis direction, and the first and second direction as the X and Y direction.

Figure 25:
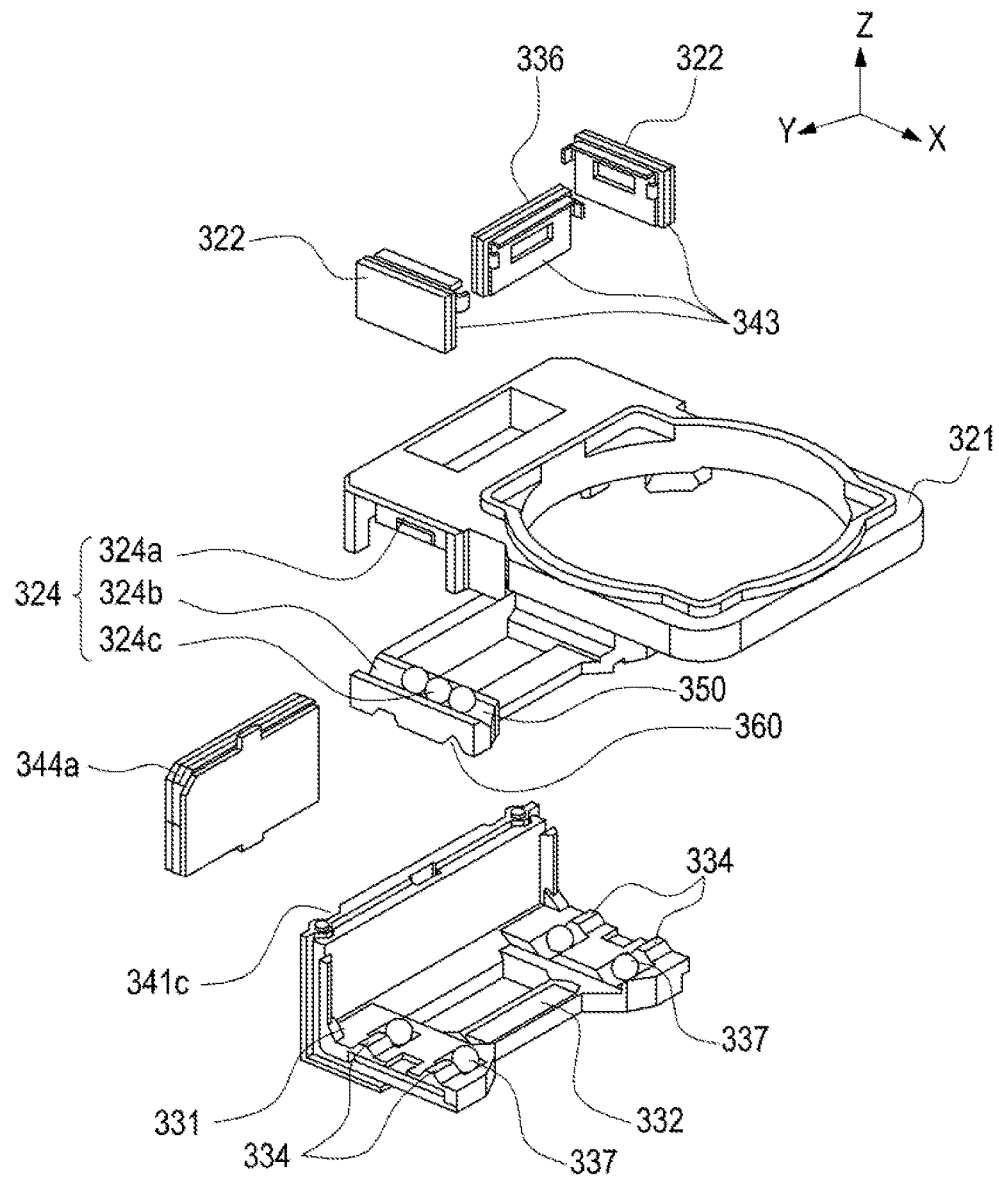
FIG. 25 is an exploded perspective view illustrating a state before coupling a first and second direction (X and Y axes) actuator among components of an OIS stabilizer among components of a camera module according to an embodiment of the present disclosure.

That is, the first and second OIS stabilizer 320 and 330 and the AF actuator 340 may be asymmetrically arranged with respect to the optical axis (Z axis). Further, the configuration of the first OIS stabilizer 320 is described in greater detail. FIG. 25 is an exploded perspective view illustrating a configuration of the first and second OIS stabilizer 320 and 330 among components of a camera module according to an embodiment of the present disclosure.

Referring to FIG. 25, the first OIS stabilizer 320 may include a lens carrier 321 coupled with the lens unit 310, a first magnet 322, a first coil 323, a first moving unit 324, and a first flexible circuit board 325. The first magnet 322 may be provided on a side surface of the lens carrier 321 to face the first coil 323 and generate a magnetic field when power is applied to the coil 323 to actuate the lens carrier 321 in the first direction (X axis). The first coil 323 may be provided on a side surface of the lens carrier 321 to face the first magnet 322, and when powered, actuate the lens carrier 321 in the first direction (X axis). The first moving unit 324 may be provided on a side surface of the lens carrier 321 to move the lens carrier 321 in the first direction (X axis). The first flexible circuit board 325 may be electrically connected with the pair of first coils 323 to supply power to the first coils 332.

As mentioned above in connection with FIG. 25, the first moving unit 324 may include, e.g., a pair of guide holes 324a, a guide member 324b, and a ball bearing 324c. The pair of guide holes 324a may be provided at a lower side of the lens carrier 321 to face the guide member 342b and move as described below. The guide member 324b may face the pair of guide holes 324a and move. The ball bearing 324c may be provided between the guide member 324b and the pair of guide holes 324a to enable the lens carrier 321 to move.

That is, the guide member 324b may be provided to face the pair of guide holes 324a on a lower surface of the lens carrier 321, and the ball bearing 324c may be provided between the guide member and the pair of guide holes 324a to move the lens carrier 321.

According to an embodiment of the present disclosure, on an end surface of the guide member 324b may be provided a first guide member 350 facing the pair of guide holes 324a and guiding the lens carrier 321 to be moved in the first direction (X axis), and on another end surface of the guide member 324b may be provided a second guide member 360 guiding the lens carrier 321 to be moved in the second direction (Y axis).

The first coils 323 may have a first location sensor 370 to detect a movement location of the lens carrier 321 in the first direction (X axis).

Figure 28:
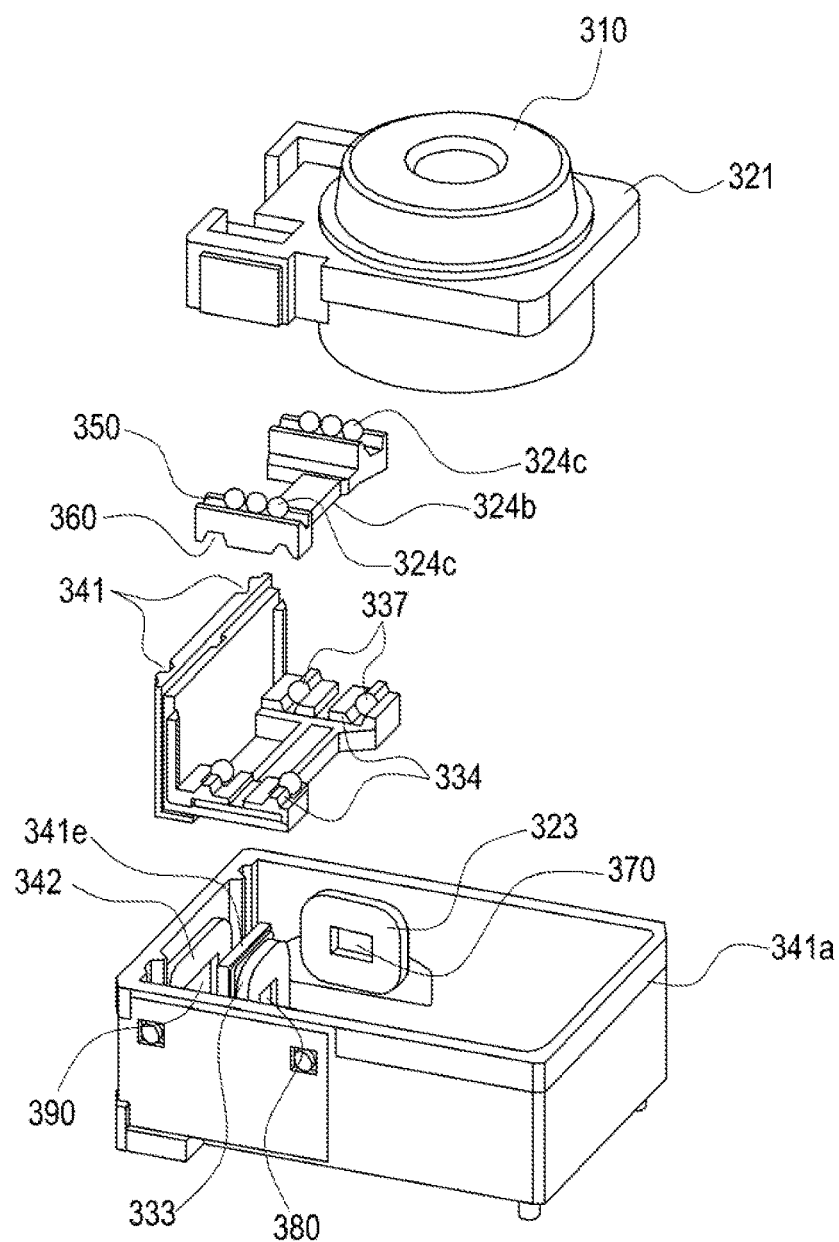
FIG. 28 is an exploded perspective view illustrating a state before a camera module is coupled according to an embodiment of the present disclosure.

The configuration of the second OIS stabilizer 330 is described in greater detail. FIG. 25 is an exploded perspective view illustrating a configuration of the second OIS stabilizer 330 among components of the camera module according to an embodiment of the present disclosure. FIG. 28 is an exploded perspective view illustrating a configuration of the second OIS stabilizer 330 among the components of the camera module according to an embodiment of the present disclosure.

Referring to FIGS. 25 and 28, the second OIS stabilizer 330 may include a base 331, a second yolk 332, a second coil 333, a plurality of second moving units 334, and a second flexible circuit board 335. The second yolk 332, the plurality of second moving units 334, and the second flexible circuit board 335 may be provided on the top surface of the base 331.

According to an embodiment of the present disclosure, on the top surface of the base 331 may be provided a plurality of first magnets 322 facing the second yolk 332 and mounted the second flexible circuit board 335.

The third yolk 332 may be provided on the base 331 to face a first and second magnet provided on a side surface of the lens carrier 321 and position and hold the lens unit 310 at the center portion of the optical axis (Z axis) direction by the magnetic force of the first and second magnet 322 and 336. The second coil 333 may be provided on a side surface of the lens carrier 321 to face the second magnet 336, and when powered, actuate the lens carrier 321 in the second direction (Y axis).

The plurality of second moving units 334 may be provided on the top surface of the base 331 to face the second guide member 360 and move the lens carrier 321 and the guide member 324b in the second direction (Y axis). The flexible circuit board 335 may be provided on the base 331 to supply power to the second coil 333 while electrically connected with the second coil 333. A plurality of balls 337 may be provided between the second guide member 360 and the second moving units 334 to move the lens carrier 321.

Further, the second coil 333 may have at least one second location sensor 380 to detect a shake movement location of the lens carrier in the second direction (Y axis).

The second location sensor 380 may be, e.g., a hall sensor. An actuating circuit unit (not shown) provided in the electronic device may apply an actuation signal for anti-shake to each coil based on vibration information detected through, e.g., an angular velocity sensor in the electronic device, e.g., information on the amount and direction of vibration, and location information on the OIS stabilizer 320 and 330 detected from the location sensor. The actuation signal may include power or current.

Further, a printed circuit board 392 including an image sensor (not shown) and an infrared light film 394 may be provided at a lower side of the base 331, and the printed circuit board 392 may be provided on a metal plate 393.

Figure 26:
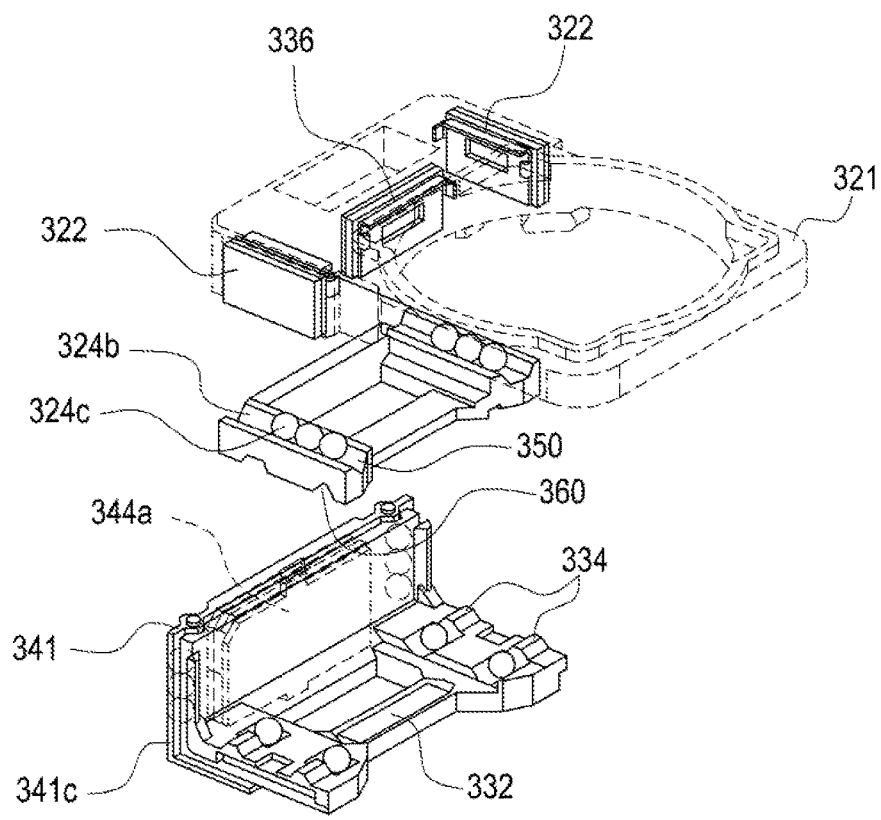
FIG. 26 is an exploded perspective view illustrating a first and second direction (X and Y axes) actuator among components of an OIS stabilizer among components of a camera module according to an embodiment of the present disclosure.
Figure 27:
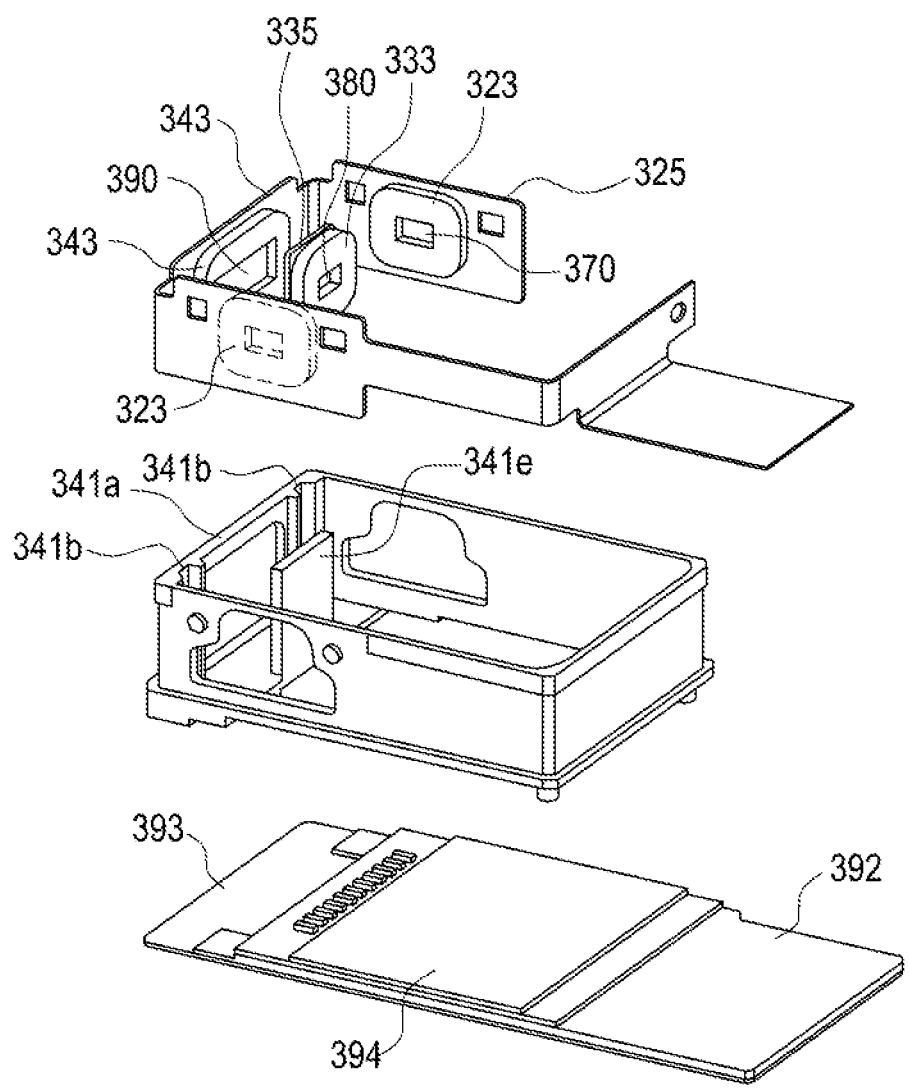
FIG. 27 is an exploded perspective view illustrating a coupled state of a flexible printed circuit board and housing among components of a camera module according to an embodiment of the present disclosure.
Figure 29:
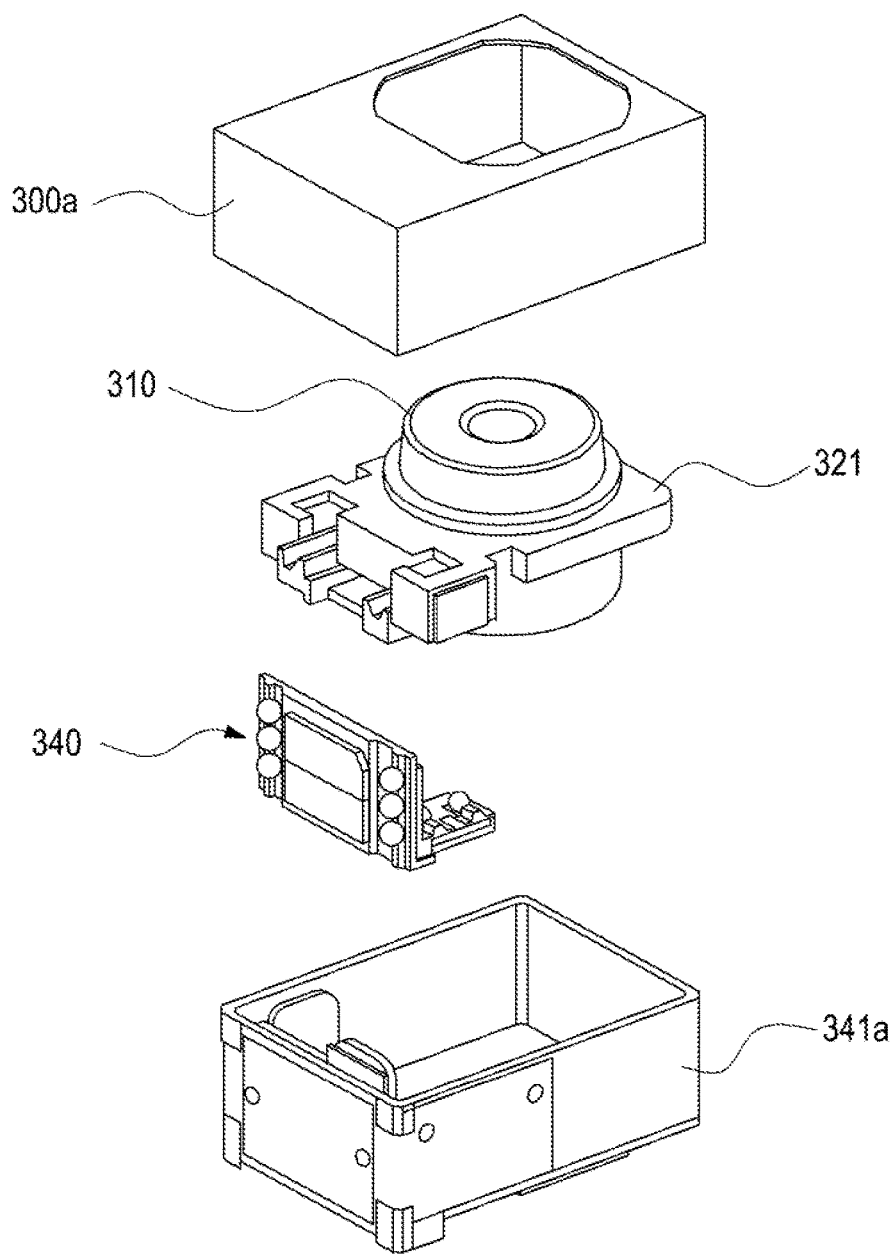
FIG. 29 is an exploded perspective view illustrating a configuration of an AF actuator among components of a camera module according to an embodiment of the present disclosure.

The configuration of the AF actuator 340 is described in further detail. FIG. 26 is an exploded perspective view illustrating a configuration of the AF actuator 340 among components of the camera module according to an embodiment of the present disclosure. FIG. 27 is an exploded perspective view illustrating a coupled state of a flexible printed circuit board and housing among components of a camera module according to an embodiment of the present disclosure. FIG. 29 is an exploded perspective view illustrating a configuration of the AF actuator 340 among the components of the camera module according to an embodiment of the present disclosure.

Referring to FIGS. 26 and 29, the AF actuator 340 may include an optical axis moving unit 341, a third coil 342, and a third flexible circuit board 343. The optical axis moving unit 341 may have a third magnet 344a and may be provided on a side surface of the base 331 in a single body to move the lens carrier 221 in the optical axis (Z axis) direction when powered. The third coil 342 may be mounted on the third flexible circuit board 343 described below to face the third magnet 344a and actuate the lens carrier 321 in the optical axis (Z axis) direction. The third flexible circuit board 343 may be provided on a side surface of the lens carrier 321 to be electrically connected with the third coil 342 while supplying power to the third coil 342.

Referring to FIGS. 24 and 27, the optical axis moving unit 341 may include a housing 341a, a first and second ball guide member 341b and 341c, and multiple ball bearings 341d. The housing 341a may have the first and second ball guide member 341b and 341c and ball bearings 341d described below. The first ball guide member 341b may be formed on an inner surface of the housing 341a to face the second ball guide member 341c described below to move the lens carrier 321 in the optical axis (Z axis) direction. The second ball guide member 341c may be formed on a side surface of the base 331 to face the first ball guide member 341b to move the lens carrier 321 in the optical axis (Z axis) direction. The second ball guide member 341c may be formed in a vertical direction on a side surface of the base 331 in a single body. The ball bearings 341d may be provided between the first and second ball guide member 341b and 341c to move the lens carrier 321 in the optical axis (Z axis) direction. The housing 341a may include a coil supporting member 341e coupled with the first coil 323 of the first OIS stabilizer 320 while supporting the first coil 223. The first, second, and third magnets 322, 336, and 344a may have a shielding yolk 341f to shield magnetic force while preventing detachment from the lens carrier 321. The third coil 342 may include a third location sensor 390 to detect a movement location of the optical axis moving unit 341.

For example, an actuating circuit unit (not shown) in the electronic device may apply an actuation signal for focusing to the second coil 333 based on focusing state information provided through a separate route and location information on the optical axis moving unit 341 detected by the location sensor. The actuation signal may include power or current.

Further, a stopper 391 may be coupled to the lens carrier 321 to limit the actuation of the lens carrier 321 in the optical axis (Z axis) direction. Assembly of the camera module is now described according to an embodiment of the present disclosure.

Figure 30:
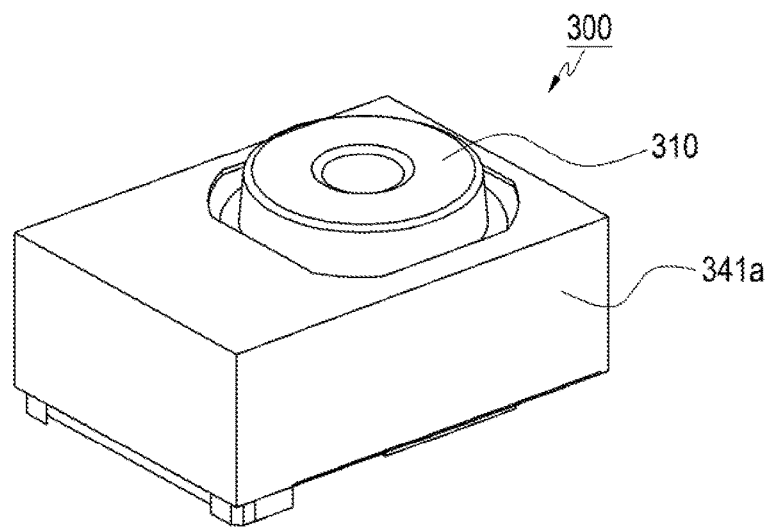
FIG. 30 is a perspective view illustrating a coupled state of a camera module according to an embodiment of the present disclosure.

FIG. 30 is a perspective view illustrating a coupled state of a camera module according to an embodiment of the present disclosure. FIG. 31 is a side cross-sectional view illustrating a coupled state of a camera module according to an embodiment of the present disclosure.

As described above in connection with FIG. 24, the lens unit 310 may be coupled to the lens carrier 321, and the first OIS stabilizer 320 may be provided at a lower side of a side surface of the lens carrier 321 to actuate the lens unit 210 in the first direction (X axis). The second OIS stabilizer 330 may be provided at a lower side of the first OIS stabilizer 320 to actuate the lens unit in the second direction (Y axis).

The AF actuator 340 may be provided on a side surface of the first and second OIS stabilizer 320 and 330 to actuate the lens unit 310 in the optical axis (Z axis) direction.

The second yolk 332 of the second OIS stabilizer 330 may face the plurality of first, second, and third magnets 322, 336, and 344a provided on the side surface of the lens carrier 321 and position the lens unit 310 at the center portion of the optical axis (Z axis) direction by the magnetic force of the first, second, and third magnets 322, 336, and 344a while maintaining the initial location. In this state, a cover unit 300a may be coupled to the base 331 to protect the first and second OIS stabilizer 320 and 330 and the AF actuator 340.

Referring to FIG. 31, the first and second OIS stabilizer 320 and 330 and the AF actuator 340 may be arranged in parallel along a side surface of the lens unit 310.

An operation of the camera module 300 is now described with reference to FIG. 31 according to an embodiment of the present disclosure.

In FIG. 24 described above, the 'Z axis' denotes an optical axis which is a vertical direction of the camera module along which the lens carrier 321 is moved, 'X axis' denotes the horizontal direction of the camera module (vertical upper and lower direction of the optical axis (Z axis)), and the Y axis denotes a vertical direction of the camera module (left and right direction of X axis and direction perpendicular to the optical axis (Z axis)). The AF actuator described below may provide an actuating force for moving the lens carrier 321 along the optical axis (Z axis) for autofocusing, and the OIS stabilizer may provide an actuating force for actuating the lens carrier 321 in the first and second direction (X and Y axes) to compensate for horizontal balance.

First, the second yolk 332 of the second OIS stabilizer 330 may be disposed to face the plurality of first, second, and third magnets provided on a side surface of the lens carrier 321 while positioning the lens unit 310 at the center portion of the optical axis (Z axis) by the magnetic force of the first, second, and third magnet. In this state, when power is applied to the first coil 323 of the first OIS stabilizer 320 through the flexible circuit board, the lens carrier 321 may be actuated in the first direction (X axis) by magnetic force generated between the first coil 323 and the first magnet 322.

At this time, since the first flexible circuit board 325 includes the first location sensor 370 recognizing and detecting a movement location of the lens carrier 321, the movement location of the lens carrier 321 may be detected by the first location sensor 370. Further, the lens carrier 321 may be actuated in the first direction (X axis) by the first coil 323 and the first magnet 322.

Further, when power is applied to the second coil 333 of the second OIS stabilizer 330, the lens carrier 321 may be actuated in the second direction (Y axis) by magnetic force generated between the second coil 333 and the second magnet 336.

At this time, since the second flexible circuit board 335 includes the second location sensor 380 recognizing and detecting a movement location of the lens carrier 321, the movement location of the lens carrier 321 may be detected by the second location sensor 380. Further, the lens carrier 321 may be actuated in the second direction (Y axis) by the second coil 333 and the third magnet 344a.

Here, upon actuating the lens unit 321 in the optical axis (Z axis) direction, power may be supplied to the third coil 342 provided on the third flexible circuit board 343 of the AF actuator. When power is fed to the third coil 342, the lens carrier 321 may be actuated along the optical axis (Z axis) direction by electromagnetic force generated between the third coil 342 and the third magnet 344a. Here, the focal length between the lens unit 310 and the image sensor (not shown) may be automatically adjusted. The first ball guide member 341b formed inside the housing 341a may face the second ball guide member 341c formed on a side surface of the base 331. Since multiple ball bearings 341d are provided between the first and second ball guide member 341b and 341c, the second ball guide member 341c of the base 331 may be moved by the ball bearings 341d. The lens carrier 321 may be moved along the optical axis (Z axis) direction by the second ball guide member 341c and the ball bearings 341d.

The third location sensor 390 provided at a position neighboring the third coil 342 may detect a movement location of the lens carrier 321 in the optical axis (Z axis) direction. As such, the first and second OIS stabilizer 320 and 330 and the AF actuator 340, which used to be arranged in series according to the related art, are arranged in parallel, allowing the product to be more compact and slimmer.

According to an embodiment of the present disclosure, as described above in connection with FIG. 24, a camera module 300 of an electronic device may comprise a lens unit 310, a first OIS stabilizer 320 provided on a side surface of the lens unit and actuating the lens unit in a first direction (X axis) to compensate for a shake of the lens unit, a second OIS stabilizer 330 provided on a side surface of the lens unit and coupled with the first OIS stabilizer and actuating the lens unit in a second direction (Y axis) to compensate for a shake of the lens unit, and an AF actuator 340 provided on a side surface of the first and second OIS stabilizer to actuate the lens unit along the optical axis (Z axis).

According to an embodiment of the present disclosure, the first and second OIS stabilizer 320 and 330 and the AF actuator 340 may be arranged in parallel along a side surface of the lens unit.

According to an embodiment of the present disclosure, as shown in FIG. 25, the first OIS stabilizer 320 may include a lens carrier coupled with the lens unit, a first magnet 322 provided on a side surface of the lens carrier, a pair of first coils 323 provided to face the first magnet and actuating the lens carrier in the first direction (X axis) when powered, a first moving unit 324 provided on a side surface of the lens carrier to move the lens carrier along the optical axis (Z axis), and a first flexible circuit board 325 electrically connected with the pair of first coils and supplying power to the pair of first coils.

According to an embodiment of the present disclosure, as shown in FIG. 25, the first moving unit 324 may include a pair of guide holes 324a provided in a side surface of the lens carrier, a guide member 324b facing the pair of guide holes, and a ball bearing 324c enabling the lens carrier to move.

According to an embodiment of the present disclosure, the guide member may include, on a first end surface thereof, a first guide member 350 facing the pair of guide holes and guiding the lens carrier to be moved in the first direction (X axis), and the guide member may include, on a second end surface thereof, a second guide member 360 guiding the lens carrier to be moved in the second direction (Y axis).

According to an embodiment of the present disclosure, as shown in FIGS. 25 and 28, the second OIS stabilizer 330 may include a base 331, a second yolk 332 provided on the base, facing a first and second magnet provided on a side surface of the lens carrier, and positioning and holding the lens carrier at a center portion of the optical axis (Z axis) direction by a magnetic force of the magnets, a second coil 333 provided on a side surface of the lens carrier, provided to face the second magnet, and actuating the lens carrier in the second direction (X axis) when powered, a plurality of second moving units 334 provided on an upper surface of the base, facing the second guide member, and moving the lens carrier and the guide member in the second direction (Y axis) perpendicular to the optical axis (Z axis), a second flexible circuit board 335 electrically connected with the second coil and supplying power to the second coil, and a plurality of balls 337 enabling the lens carrier to move.

According to an embodiment of the present disclosure, as shown in FIGS. 26 and 29, the AF actuator 340 may include an optical axis moving unit 341 provided on a side surface of the base in a single body, having a third magnet 344a, and moving the lens carrier in the optical axis (Z axis) direction when powered, a third coil 342 provided to face the third magnet and actuating the lens carrier along the optical axis (Z axis) when powered, and a third flexible circuit board 343 electrically connected with the third coil and supplying power to the third coil.

According to an embodiment of the present disclosure, as shown in FIGS. 24 and 27, the optical axis moving unit 341 may include a housing 341a, a first ball guide member 341b formed inside the housing, a second ball guide member 341c formed on a side surface of the base and facing the first ball guide member to move the lens carrier in the optical axis (Z axis) direction, and a ball bearing 341d enabling the lens carrier to move in the optical axis direction.

According to an embodiment of the present disclosure, the housing further may include a coil supporting member 341e coupled with a first coil of the first OIS stabilizer while supporting the first coil.

According to an embodiment of the present disclosure, the first, second, and third magnet may include a shielding yolk 341f shielding a magnetic force and preventing detachment from the lens carrier.

According to an embodiment of the present disclosure, the first coils may include a first location sensor 370 detecting a movement location of the lens carrier in the first direction (X axis), the second coil may include a second location sensor 380 detecting a movement location of the lens carrier in the second direction (Y axis), and the third coil may include a third location sensor 390 detecting a movement location of the optical axis moving unit.

According to an embodiment of the present disclosure, the lens carrier may be coupled with a stopper 391 limiting actuation of the lens carrier in the optical axis (Z axis) direction.

Further, according to an embodiment of the present disclosure, a camera module 300 of an electronic device 10 may comprise a lens unit 310 (as shown in FIG. 18), an autofocus (AF) actuator 340 (as shown in FIG. 24) connected with the lens unit in an optical axis (Z axis) direction, a first and second optical image stabilization (OIS) actuator 320 and 330 (as shown in FIG. 24) connected with the AF actuator in a first and second direction (X and Y axes), and a processor (not shown), and the processor may be configured to move the lens unit 410 in the optical axis (Z axis) direction using the AF actuator 340 at least based on a location of an external object (not shown), move the lens unit 310 in the first and second direction (X and Y axes) on a plane perpendicular to the optical axis (Z axis) using the first and second OIS stabilizer at least based on a movement of the electronic device 10, and obtain at least one image for the external object using the lens unit 310.

According to an embodiment of the present disclosure, location recognition between the external object and the electronic device 10 may include contrast-based recognition (e.g., contrast autofocus (CAF), phase difference-based recognition (phase autofocus (PAF), and depth sensor-based recognition. To recognize the location between the external object and the electronic device, other methods than the above-described recognition method may also be adopted.

According to an embodiment of the present disclosure, an operation of the camera module 300 in the electronic device is described below in further detail.

Referring to FIG. 32 mentioned above, the camera module 300 (as shown in FIG. 24) in the electronic device including the lens unit 310 (as shown in FIG. 24), the AF actuator 340 (as shown in FIG. 24) connected with the lens unit in the optical axis (Z axis) direction, and the first and second OIS stabilizer 320 and 330 (as shown in FIG. 24) connected with the AF actuator in the first and second direction (X and Y axes), may be operated to move the lens unit 310 in the optical axis (Z axis) direction using the AF actuator 340 at least based on the location between an external object (not shown) and the electronic device 10 at operation S1 and move the lens unit in the first and second direction (X and Y axes) on a plane perpendicular to the optical axis (Z axis) using the first and second OIS stabilizer 320 and 330 at least based on the movement of the electronic device at operation S2.

Next, it may obtain at least one image on the external object using the lens unit 310 at operation S3.

Further, the electronic device 10 may include a processor (not shown). The processor may actuate the lens unit 310 to move in the optical axis or first and second direction on a plan perpendicular to the optical axis (Z axis) using the AF actuator 340 and the first and second OIS stabilizer 320 and 330 at least based on the movement of the electronic device 10.

Figure 33:
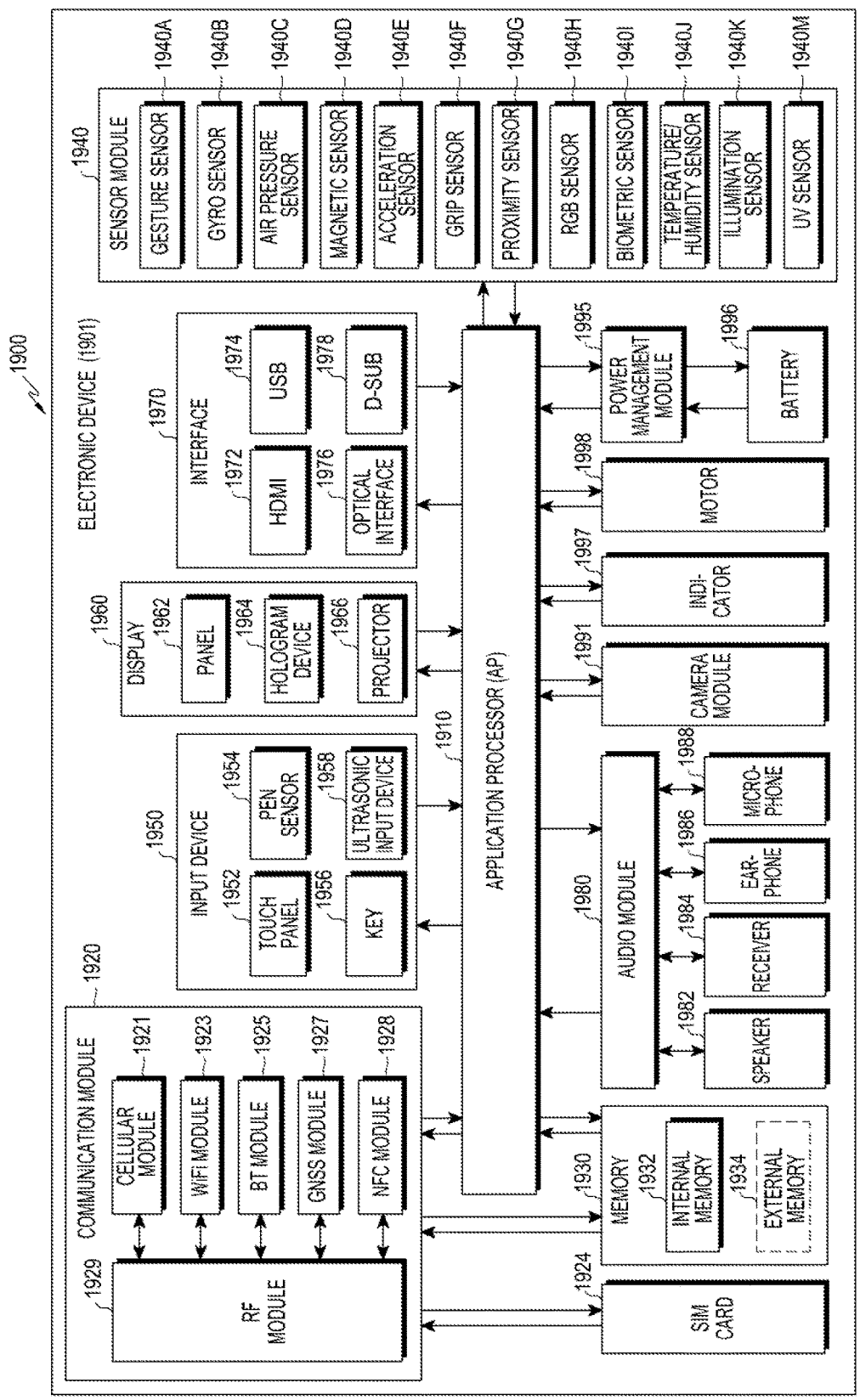
FIG. 33 is a block diagram illustrating a detailed configuration of an electronic device according to an embodiment of the present disclosure.

FIG. 33 is a block diagram 1900 illustrating an electronic device 1901 according to an embodiment of the present disclosure. The electronic device 1901 may include the whole or part of the configuration of, e.g., the electronic device 10 shown in FIG. 1. The electronic device 1901 may include one or more processors (e.g., application processors (APs)) 1910, a communication module 1920, a subscriber identification module (SIM) 1924, a memory 1930, a sensor module 1940, an input device 1950, a display 1960, an interface 1970, an audio module 1980, a camera module 1991, a power management module 1995, a battery 1996, an indicator 1997, and a motor 1998.

The processor 1910 may control multiple hardware and software components connected to the processor 1910 by running, e.g., an operating system (OS) or application programs, and the processor 1910 may process and compute various data. The processor 1910 may be implemented in, e.g., a system on chip (SoC). According to an embodiment of the present disclosure, the processor 1910 may further include a graphics processing unit (GPU) and/or an image signal processor (ISP). The processor 1910 may include at least some (e.g., the cellular module 1921) of the components shown in FIG. 19. The processor 1910 may load a command or data received from at least one of other components (e.g., a non-volatile memory) on a volatile memory, process the command or data, and store various data in the non-volatile memory.

The communication module 1920 may have the same or similar configuration to the communication interface 170 shown in FIG. 3. The communication module 1920 may include, e.g., a cellular module 1921, a Wi-Fi module 1923, a Bluetooth (BT) module 1925, a GNSS module 1927 (e.g., a GPS module, a Glonass module, a Beidou module, or a Galileo module), an NFC module 1928, and a radio frequency (RF) module 1929.

The cellular module 1921 may provide voice call, video call, text, or Internet services through, e.g., a communication network. The cellular module 1921 may perform identification or authentication on the electronic device 1901 in the communication network using a subscriber identification module 1924 (e.g., the SIM card). According to an embodiment of the present disclosure, the cellular module 1921 may perform at least some of the functions providable by the processor 1910. According to an embodiment of the present disclosure, the cellular module 1921 may include a communication processor (CP).

The Wi-Fi module 1923, the BT module 1925, the GNSS module 1927, or the NFC module 1928 may each include a processor for, e.g., processing data communicated through the module. According to an embodiment of the present disclosure, at least some (e.g., two or more) of the cellular module 1921, the Wi-Fi module 1923, the BT module 1925, the GNSS module 1927, or the NFC module 1928 may be included in a single integrated circuit (IC) or an IC package.

The RF module 1929 may communicate data, e.g., communication signals (e.g., RF signals). The RF module 1929 may include, e.g., a transceiver, a power amplifier module (PAM), a frequency filter, a low noise amplifier (LNA), or an antenna. According to an embodiment of the present disclosure, at least one of the cellular module 1921, the Wi-Fi module 1923, the BT module 1925, the GNSS module 1927, or the NFC module 1928 may communicate RF signals through a separate RF module.

The subscription identification module 1924 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 1930 (e.g., the memory 130) may include, e.g., an internal memory 1932 or an external memory 1934. The internal memory 1932 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD)).

The external memory 1934 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 1934 may be functionally and/or physically connected with the electronic device 1901 via various interfaces.

For example, the sensor module 1940 may measure a physical quantity or detect a motion state of the electronic device 1901, and the sensor module 240 may convert the measured or detected information into an electrical signal. The sensor module 1940 may include at least one of, e.g., a gesture sensor 1940A, a gyro sensor 1940B, an atmospheric pressure sensor 1940C, a magnetic sensor 1940D, an acceleration sensor 1940E, a grip sensor 1940F, a proximity sensor 1940G, a color sensor 1940H such as an red-green-blue (RGB) sensor, a bio sensor 1940I, a temperature/humidity sensor 1940J, an illumination sensor 1940K, or an ultra violet (UV) sensor 1940M. Additionally or alternatively, the sensing module 1940 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1940 may further include a control circuit for controlling at least one or more of the sensors included in the sensing module. According to an embodiment of the present disclosure, the electronic device 1901 may further include a processor configured to control the sensor module 1940 as part of the processor 1910 or separately from the processor 1910, and the electronic device 2701 may control the sensor module 1940 while the processor 210 is in a sleep mode.

The input unit 1950 may include, e.g., a touch panel 1952, a digital stylus or (digital) pen sensor 1954, a key 1956, or an ultrasonic input device 1958. The touch panel 1952 may use at least one of capacitive, resistive, infrared, or ultrasonic methods. The touch panel 1952 may further include a control circuit. The touch panel 1952 may further include a tactile layer and may provide a user with a tactile reaction.

The digital stylus or (digital) pen sensor 1954 may include, e.g., a part of a touch panel or a separate sheet for recognition. The key 1956 may include e.g., a physical button, optical key or key pad. The ultrasonic input device 1958 may sense an ultrasonic wave generated from an input tool through a microphone (e.g., the microphone 1988) to identify data corresponding to the sensed ultrasonic wave.

The display 1960 (e.g., the display 160) may include a panel 1962, a hologram device 1964, or a projector 1966. The panel 1962 may have the same or similar configuration to the display 160 shown in FIG. 3. The panel 1962 may be implemented to be flexible, transparent, or wearable. The panel 1962 may also be incorporated with the touch panel 1952 in a module. The hologram device 1964 may make three dimensional (3D) images (holograms) in the air by using light interference. The projector 1966 may display an image by projecting light onto a screen. The screen may be, for example, located inside or outside of the electronic device 1901. In accordance with an embodiment, the display 1960 may further include a control circuit to control the panel 1962, the hologram device 1964, or the projector 1966.

The interface 1970 may include e.g., a high definition multimedia interface (HDMI) 1972, a USB 1974, an optical interface 1976, or a D-subminiature (D-sub) 1978. The interface 1970 may be included in e.g., the communication interface 170 shown in FIG. 3. Additionally or alternatively, the interface 1970 may include a mobile high-definition link (MHL) interface, a secure digital (SD) card/multimedia card (MMC) interface, or infrared data association (IrDA) standard interface.

The audio module 1980 may convert a sound into an electric signal or vice versa, for example. At least a part of the audio module 1980 may be included in e.g., the input/output interface 145 as shown in FIG. 3. The audio module 1980 may process sound information input or output through e.g., a speaker 1982, a receiver 1984, an earphone 1986, or a microphone 1988.

For example, the camera module 1991 may be a device for recording still images and videos, and may include, according to an embodiment of the present disclosure, one or more image sensors (e.g., front and back sensors), a lens, an image signal processor (ISP), or a flash such as an LED or xenon lamp.

The power manager module 1995 may manage power of the electronic device 1901, for example. Although not shown, according to an embodiment of the present disclosure, the power manager module 1995 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 1996, a voltage, a current, or a temperature while the battery 1996 is being charged. The battery 1996 may include, e.g., a rechargeable battery or a solar battery.

The indicator 1997 may indicate a particular state of the electronic device 1901 or a part (e.g., the processor 1910) of the electronic device, including e.g., a booting state, a message state, or recharging state. The motor 1998 may convert an electric signal to a mechanical vibration and may generate a vibrational or haptic effect. Although not shown, a processing unit for supporting mobile TV, such as a GPU may be included in the electronic device 1901. The processing unit for supporting mobile TV may process media data conforming to a standard for digital multimedia broadcasting (DMB), digital video broadcasting (DVB), or media-Flo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include another additional component(s). Some of the components may be combined into an entity, but the entity may perform the same functions as the components may do.

Figure 34:
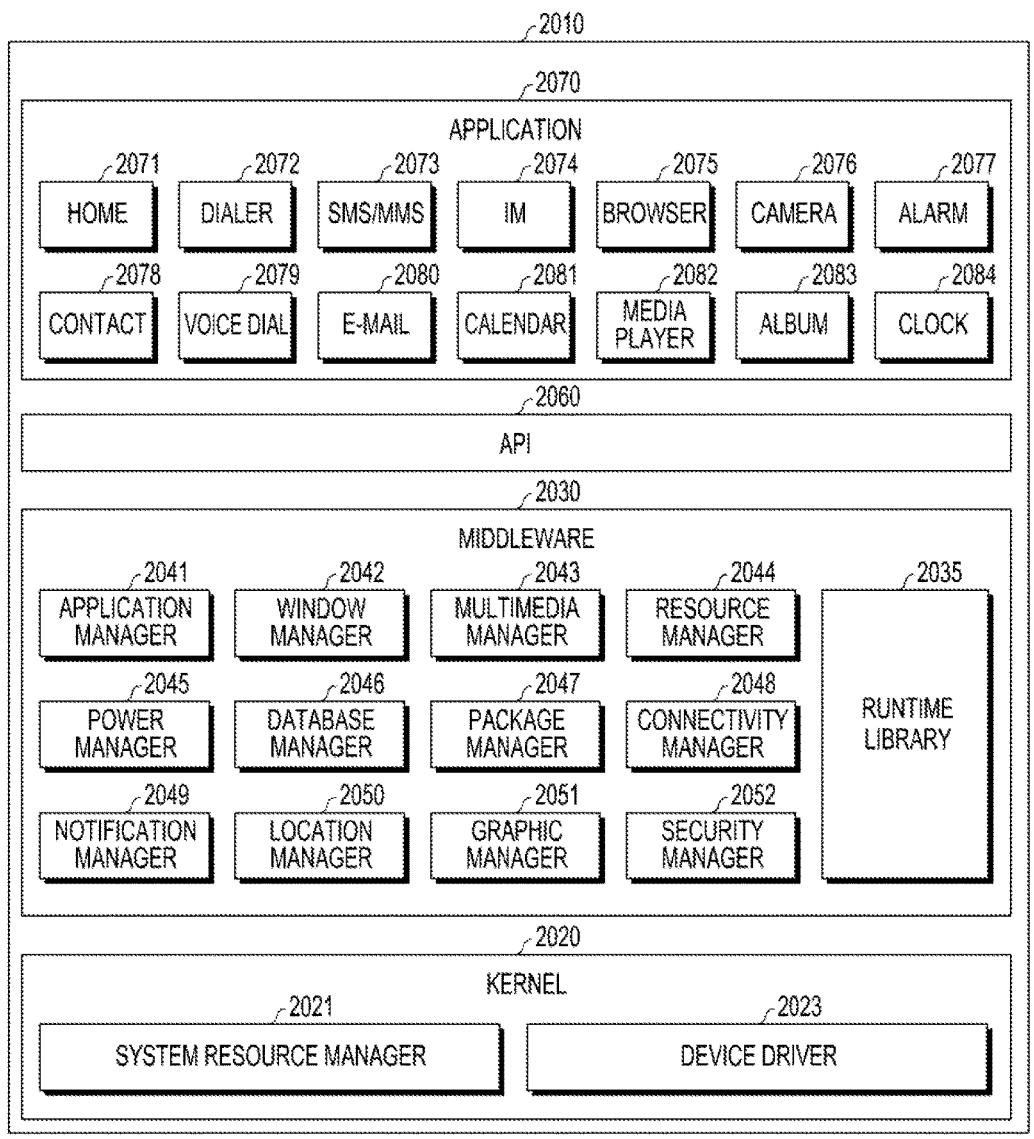
FIG. 34 is a block diagram illustrating a program module according to an embodiment of the present disclosure.

FIG. 34 is a block diagram illustrating a program module according to an embodiment of the present disclosure. According to an embodiment of the present disclosure, the program module 2010 (e.g., the program 140 shown in FIG. 3) may include an operating system (OS) controlling resources related to the electronic device (e.g., the electronic device 10 or 101 shown in FIG. 1 or 3) and/or various applications (e.g., the application processor 147 shown in FIG. 3) driven on the operating system (OS). The OS may include, e.g., Android™, iOS™, Windows™, Symbian®, Tizen, or Bada®.

The program 2010 may include, e.g., a kernel 2020, middleware 2030, an application programming interface (API) 2060, and/or an application 2070. At least a part of the program module 2010 may be preloaded on the electronic device or may be downloaded from an external electronic device (e.g., the electronic devices 102 and 104 or server 106, shown in FIG. 3).

The kernel 2020 (e.g., the kernel 141 shown in FIG. 3) may include, e.g., a system resource manager 2021 and/or a device driver 2023. The system resource manager 2021 may perform control, allocation, or recovery of system resources. According to an embodiment of the present disclosure, the system resource manager 2021 may include a process managing unit, a memory managing unit, or a file system managing unit. The device driver 2023 may include, e.g., a display driver, a camera driver, a BT driver, a shared memory driver, a USB driver, a keypad driver, a Wi-Fi driver, an audio driver, or an inter-process communication (IPC) driver.

The middleware 2030 may provide various functions to the application 2070 through the API 2060 so that the application 2070 may efficiently use limited system resources in the electronic device or provide functions jointly required by applications 2070. According to an embodiment of the present disclosure, the middleware 2030 (e.g., the middleware 143 shown in FIG. 3) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, or a security manager 2052.

The runtime library 2035 may include a library module used by a compiler in order to add a new function through a programming language while, e.g., the application 2070 is being executed. The runtime library 2035 may perform input/output management, memory management, or operation on arithmetic functions.

The application manager 2041 may manage the life cycle of at least one application of, e.g., the applications 2070. The window manager 2042 may manage graphical user interface (GUI) resources used on the screen. The multimedia manager 2043 may grasp formats necessary to play various media files and use a codec appropriate for a format to perform encoding or decoding on media files. The resource manager 2044 may manage resources, such as source code of at least one of the applications 2070, memory or storage space.

The power manager 2045 may operate together with, e.g., a basic input/output system (BIOS) to manage battery or power and provide power information necessary for operating the electronic device. The database manager 2046 may generate, search, or vary a database to be used in at least one of the applications 2070. The package manager 2047 may manage installation or update of an application that is distributed in the form of a package file.

The connectivity manager 2048 may manage wireless connectivity, such as, e.g., Wi-Fi or BT. The notification manager 2049 may display or notify an event, such as a coming message, appointment, or proximity notification, of the user without interfering with the user. The location manager 2050 may manage locational information on the electronic device. The graphic manager 2051 may manage graphic effects to be offered to the user and their related user interface. The security manager 2052 may provide various security functions necessary for system security or user authentication. According to an embodiment of the present disclosure, when the electronic device (e.g., the electronic device 10) has telephony capability, the middleware 2030 may further include a telephony manager for managing voice call or video call functions of the electronic device.

The middleware 2030 may include a middleware module forming a combination of various functions of the above-described components. The middleware 2030 may provide a specified module per type of the operating system (OS) in order to provide a differentiated function. Further, the middleware 2030 may dynamically omit some existing components or add new components.

The API 2060 (e.g., the API 145) may be a set of, e.g., API programming functions and may have different configurations depending on OSs. For example, in the case of Android™ or iOS™, one API set may be provided per platform, and in the case of Tizen, two or more API sets may be offered per platform.

The application 2070 (e.g., the application 147 shown in FIG. 3) may include one or more applications that may provide functions such as, e.g., a home 2071, a dialer 2072, a short message service (SMS)/multimedia messaging service (MMS) 2073, an instant message (IM) 2074, a browser 2075, a camera 2076, an alarm 2077, a contact 2078, a voice dial 2079, an email 2080, a calendar 2081, a media player 2082, an album 2083, or a clock 2084, a health-care (e.g., measuring the degree of workout or blood sugar), or provision of environmental information (e.g., provision of air pressure, moisture, or temperature information).

According to an embodiment of the present disclosure, the application 2070 may include an application (hereinafter, "information exchanging application" for convenience) supporting information exchange between the electronic device (e.g., the electronic device 10 or 101 shown in FIG. 1 or 3) and an external electronic device (e.g., the electronic devices 102 and 104 shown in FIG. 3). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 2070 may include an application (e.g., a health-care application of a mobile medical device) designated according to an attribute of the external electronic device (e.g., the electronic devices 102 and 104). According to an embodiment of the present disclosure, the application 2070 may include an application received from the external electronic device (e.g., the server 106 or electronic devices 102 and 104). According to an embodiment of the present disclosure, the application 2070 may include a preloaded application or a third party application downloadable from a server. The names of the components of the program module 2010 according to the shown embodiment may be varied depending on the type of operating system (OS).

According to an embodiment of the present disclosure, at least a part of the program module 210 may be implemented in software, firmware, hardware, or in a combination of two or more thereof. At least a part of the programming module 2010 may be implemented (e.g., executed) by e.g., a processor (e.g., the processor 1910 shown in FIG. 33). At least a part of the program module 2010 may include e.g., a module, program, routine, set of instructions, process, or the like for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120 shown in FIG. 3), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A camera comprising:
   a lens;
   at least one autofocus (AF) actuator for moving the lens in a first direction; and
   at least one optical image stabilization (OIS) stabilizer for moving the lens in at least one direction,
   wherein the OIS stabilizer is connected with the AF actuator, and
   wherein the OIS stabilizer is not stacked over the AF actuator in the first direction.

2. The camera of claim 1,
   wherein the at least one OIS stabilizer comprises a coupler coupled with the at least one AF actuator on a surface thereof, and
   wherein, as the at least one AF actuator moves in the first direction, the at least one OIS stabilizer moves in the first direction as well.

3. The camera of claim 1,
   wherein the at least one OIS stabilizer comprises:
   a base,
   a moving device for moving in a second direction, and
   at least one actuator connected with the base and the moving device, and
   wherein the at least one actuator moves the moving device in the second direction.

4. An electronic device comprising:
   a camera including:
   a lens,
   at least one autofocus (AF) actuator for moving the lens in a first direction, and
   at least one optical image stabilization (OIS) stabilizer for moving the lens in a second direction,
   wherein the OIS stabilizer is connected with the AF actuator, and
   wherein the OIS stabilizer is not stacked over the AF actuator in the first direction.

5. The electronic device of claim 4,
   wherein the at least one OIS stabilizer includes a coupler coupled with the at least one AF actuator on a surface thereof, and
   wherein, as the at least one AF actuator moves in the first direction, the at least one OIS stabilizer moves in the first direction as well.

6. The electronic device of claim 4, wherein the at least one OIS stabilizer comprises: a base,
   a moving device configured to move in the second direction, and at least one actuator connected with the base and the moving device, and wherein the at least one actuator moves the moving device in the second direction.

7. The electronic device of claim 6,
   wherein the at least one OIS stabilizer includes a yolk connected with the moving device and at least one magnet connected with the base, and
   wherein the camera utilizes the yolk and the at least one magnet to move the moving device in the second direction.

8. The electronic device of claim 7, wherein the OIS stabilizer positions the lens at a center portion of the frequency by a magnetic force of the magnet and the yolk.

9. The electronic device of claim 7,
   wherein the magnet is disposed at a lower side of the moving device, and
   wherein the yolk is disposed at an upper side of a fastening device while facing the magnet.

10. The electronic device of claim 6, wherein the at least one OIS stabilizer further comprises at least one ball provided to reduce a frictional force between the moving device and the base.

11. The electronic device of claim 6, wherein the at least one OIS stabilizer further comprises a location sensor for detecting a movement location of the moving device.

12. The electronic device of claim 4,
   wherein the at least one actuator includes a first sub actuator and a second sub actuator,
   wherein the second direction includes a first sub direction and a second sub direction,
   wherein the first sub actuator moves the moving device in the first sub direction, and
   wherein the second sub actuator moves the moving device in the second sub direction.

13. The electronic device of claim 4,
   wherein the at least one OIS stabilizer further comprises a first OIS stabilizer and a second OIS stabilizer,
   wherein the second direction includes a first sub direction and a second sub direction,
   wherein the first OIS stabilizer moves the lens in the first sub direction, and
   wherein the second OIS stabilizer moves the lens in the second sub direction.

14. The electronic device of claim 4, wherein the AF actuator and the OIS stabilizer are arranged in parallel along a side surface of the lens.

15. The electronic device of claim 4, wherein the AF actuator comprises:
   a lens carrier having the lens,
   a lens housing coupled with the lens carrier,
   a first direction moving device including an AF-side magnet and a coil provided on a side surface of the lens housing to move the lens carrier in the first direction when powered, and
   a flexible circuit board electrically connected with the coil of the first direction moving device,
   wherein the flexible circuit supplies power to the coil.

16. The electronic device of claim 15,
   wherein the first direction moving device comprises:
   the AF-side magnet provided on a side surface of the lens carrier,
   a first guide member provided on a side surface of the lens housing and the coil facing the AF-side magnet to move the lens carrier in the first direction when powered, a plurality of ball bearings, and
a second guide member provided on a side surface of the lens carrier to face the first guide member,
wherein the second guide member moves the lens carrier in the first direction, and
wherein the plurality of ball bearings enables the lens carrier to move.

17. The electronic device of claim 16,
wherein the first guide member includes a first yolk disposed to face the AF-side magnet with the coil disposed therebetween, and
wherein the second guide member includes a second yolk disposed to face the coil with the AF-side magnet disposed therebetween.

18. The electronic device of claim 16, wherein the first direction moving device includes at least one location sensor for detecting a movement location of the first direction moving device.

19. An electronic device comprising:
a camera comprising:
a lens,
an autofocus (AF) actuator for actuating the lens along an optical axis, and
a first optical image stabilization (OIS) stabilizer and a second optical image stabilization (OIS) stabilizer for respectively actuating the lens on a plane perpendicular to the optical axis in a first direction and a second direction different from the first direction to compensate for vibration of the lens,
wherein the first OIS stabilizer, the second OIS stabilizer, and the AF actuator are arranged in a direction of a side surface of the lens,
wherein the AF actuator and at least one of the first OIS stabilizer or the second OIS stabilizer are arranged in parallel, and
wherein the first OIS stabilizer, the second OIS stabilizer, and the AF actuator are arranged in parallel in the direction of the side surface of the lens while the AF actuator is disposed between the first OIS actuator and the second OIS stabilizer.

20. The electronic device of claim 19, wherein the first OIS stabilizer comprises:
a lens carrier coupled with the lens,
a first magnet provided on a side surface of the lens carrier,
a first coil provided to face the first magnet, wherein the first coil actuates the lens carrier in the second direction when powered, and
a first moving device provided on the side surface of the lens carrier and moving the lens carrier in the second direction.

21. The electronic device of claim 20, wherein the first moving device comprises:
a pair of guide holes provided in a side surface of the lens carrier,
a guide member having a first yolk, and
a second magnet facing the pair of guide holes, and a ball bearing enabling the lens carrier to move.

22. The electronic device of claim 21,
wherein the guide member includes, on a first end surface thereof, a first guide member facing the pair of guide holes, having the first yolk, and guiding the lens carrier to be moved in the second direction, and
wherein the guide member includes, on a second end surface thereof, a second guide member having the second magnet and guiding the lens carrier to be moved in the optical axis direction.

23. The electronic device of claim 22, wherein the AF actuator includes an optical axis moving device provided on a side surface of the first OIS stabilizer, facing the second guide member, and moving the lens carrier in the optical axis direction when powered and a flexible circuit board electrically connected with the optical axis moving device and supplying power.

24. The electronic device of claim 23, wherein the optical axis moving device comprises:
a moving body,
a first ball guide member having a second coil formed inside the moving body, facing the second guide member, the first ball guide member faces the second magnet and moving the lens carrier in the optical axis direction when powered,
a plurality of multiple ball bearings enabling the lens carrier to move in the optical axis direction, and
a plurality of second ball guide members extending from an outer surface of the moving body to move the lens carrier in the first direction.

25. The electronic device of claim 24, wherein the moving body includes a coil supporting member coupled with a first coil of the first OIS stabilizer while supporting the first coil.

26. The electronic device of claim 24, wherein the first ball guide member includes a second yolk disposed to face the second magnet with the second coil disposed therebetween.

27. The electronic device of claim 24, wherein the optical axis moving device includes a location sensor detecting a movement location of the optical axis moving device.

28. The electronic device of claim 20,
wherein the second OIS stabilizer comprises:
a base including a plurality of third magnets on an upper surface thereof, a third yolk facing the third magnets, the third yolk positioning and holding the lens carrier at a center portion of the optical axis direction by a magnetic force of the third magnets,
a plurality of first moving devices provided on the upper surface of the base, facing the second ball guide member, to move the lens carrier in the first direction perpendicular to the optical axis,
a fastening device provided on the upper surface of the base, and
a second moving device facing the fastening device, and
wherein the second moving device moves the lens carrier, the first OIS stabilizer, and the AF actuator in the first direction.

29. The electronic device of claim 28, wherein the second OIS stabilizer includes:
a first actuator provided between the fastening device and the second moving device and controlling a length when powered to move the second moving device in the first direction,
a second actuator provided between the fastening device and the second moving device to provide an elastic force enabling the second moving device to move in the first direction,
a flexible circuit board provided on the base and electrically connected with the first actuator to supply power to the first actuator, and
a plurality of balls enabling the lens carrier to move.

30. The electronic device of claim 29, wherein the first actuator includes a pair of supporting members coupled and fastened to the fastening device and coupled to the first actuator while supporting the first actuator.

31. An electronic device, comprising a camera including:
a lens;

a first optical image stabilization (OIS) stabilizer provided on a side surface of the lens and actuating the lens in a first direction to compensate for vibration of the lens;
a second OIS stabilizer provided on a side surface of the lens, coupled with the first OIS stabilizer, the second OIS stabilizer actuates the lens in a second direction to compensate for the vibration of the lens; and
an autofocus (AF) actuator provided on a side surface of the first OIS stabilizer and the second OIS stabilizer to actuate the lens along an optical axis,
wherein the AF actuator and at least one of the first OIS stabilizer or the second OIS stabilizer are arranged in parallel.

32. The electronic device of claim 31, wherein the first OIS stabilizer, the second OIS stabilizer, and the AF actuator are arranged in parallel along the side surface of the lens.

33. The electronic device of claim 32, wherein the first OIS stabilizer comprises:
a lens carrier coupled with the lens,
a first magnet provided on a side surface of the lens carrier, a pair of first coils provided to face the first magnet, the pair of first coils actuates the lens carrier in the first direction when powered,
a first moving device provided on a side surface of the lens carrier to move the lens carrier along the optical axis, and
a first flexible circuit board electrically connected with the pair of first coils and supplying power to the pair of first coils.

34. The electronic device of claim 33, wherein the first moving device comprises:
a pair of guide holes provided in a side surface of the lens carrier,
a guide member facing the pair of guide holes, and
a ball bearing enabling the lens carrier to move.

35. The electronic device of claim 34,
wherein the guide member includes, on a first end surface thereof, a first guide member facing the pair of guide holes, the guide member guides the lens carrier to be moved in the first direction, and
wherein the guide member includes, on a second end surface thereof, a second guide member guiding the lens carrier to be moved in the second direction.

36. The electronic device of claim 35, wherein the second OIS stabilizer comprises:
a base,
a second yolk provided on the base, facing a first and second magnet provided on a side surface of the lens carrier, the second yolk positions and holds the lens carrier at a center portion of the optical axis direction by a magnetic force of the magnets,
a second coil provided on a side surface of the lens carrier, provided to face the second magnet, the second coil actuates the lens carrier in the second direction when powered,
a plurality of second moving devices provided on an upper surface of the base, facing the second guide member, the plurality of second moving devices moves the lens carrier and the guide member in the second direction perpendicular to the optical axis,
a second flexible circuit board electrically connected with the second coil, the second flexible axis supplies power to the second coil, and
a plurality of balls for enabling the lens carrier to move.

37. The electronic device of claim 36, wherein the AF actuator comprises:
an optical axis moving device provided on a side surface of the base in a single body, the optical axis moving device including a third magnet, the optical axis moving device moves the lens carrier in the optical axis direction when powered,
a third coil provided to face the third magnet, the third coil actuates the lens carrier along the optical axis when powered, and
a third flexible circuit board electrically connected with the third coil, the third flexible circuit supplies power to the third coil.

38. The electronic device of claim 37, wherein the optical axis moving device comprises:
a housing,
a first ball guide member formed inside the housing,
a second ball guide member formed on a side surface of the base, the second ball guide member facing the first ball guide member to move the lens carrier in the optical axis direction, and
a ball bearing for enabling the lens carrier to move in the optical axis direction.

39. The electronic device of claim 38, wherein the housing includes a coil supporting member coupled with a first coil of the first OIS stabilizer while supporting the first coil.

40. The electronic device of claim 39, wherein the first magnet, the second magnet, and the third magnet each includes a shielding yolk for shielding a magnetic force and preventing detachment from the lens carrier.

41. The electronic device of claim 40,
wherein the first coils include a first location sensor for detecting a movement location of the lens carrier in the first direction,
wherein the second coil includes a second location sensor for detecting a movement location of the lens carrier in the second direction, and
wherein the third coil includes a third location sensor for detecting a movement location of the optical axis moving device.

42. The electronic device of claim 41, wherein the lens carrier is coupled with a stopper limiting actuation of the lens carrier in the optical axis direction.

43. An electronic device comprising:
a lens;
an autofocus (AF) actuator connected with the lens in a first direction;
an optical image stabilization (OIS) stabilizer connected with the AF actuator in a second direction; and
a processor configured to control for:
moving the lens in the first direction using the AF actuator, at least based on a location of an external object,
moving the lens in the second direction using the OIS stabilizer at least based on a movement of the electronic device, and
obtaining at least one image for the external object using the lens, wherein the AF actuator and the OIS stabilizer are arranged in parallel.

44. The electronic device of claim 43, wherein a location recognition between the external object and the electronic device includes contrast-based recognition, phase difference-based recognition, or depth sensor-based recognition.

45. A method performed by an electronic device including a lens, an autofocus (AF) actuator connected with the lens in a first direction, and an optical image stabilization (OIS) stabilizer connected with the AF actuator in a second direction, wherein the AF actuator and the OIS stabilizer are arranged in parallel the method comprising:

moving the lens in the first direction using the AF actuator at least based on a location between an external object and the electronic device; and moving the lens in the second direction using the OIS stabilizer at least based on a movement of the electronic device.

46. The method of claim 45, further comprising:

actuating the lens to move in the first direction and the second direction using the AF actuator and the OIS stabilizer at least based on the movement of the electronic device.

47. The method of claim 46, further comprising:

recognizing the location between the external object and the electronic device by at least one of contrast-based recognition, phase difference-based recognition, or depth sensor-based recognition.

48. The method of claim 47, further comprising:

obtaining, by the electronic device, at least one image on the external object using the lens.

* * * * *